(12) United States Patent
May et al.

(10) Patent No.: US 11,412,016 B2
(45) Date of Patent: Aug. 9, 2022

(54) GAMIFIED VIRTUAL CONFERENCE WITH NETWORK SECURITY TRAINING OF NETWORK SECURITY PRODUCTS

(71) Applicant: Fortinet, Inc., Sunnyvale, CA (US)

(72) Inventors: Robert A. May, North Vancouver (CA); Jordan E. Thompson, Vancouver (CA); Jamie Pate, Port Moody (CA)

(73) Assignee: Fortinet, Inc., Sunnyvale, CA (US)

( * ) Notice: Subject to any disclaimer, the term of this patent is extended or adjusted under 35 U.S.C. 154(b) by 1 day.

(21) Appl. No.: 16/915,727

(22) Filed: Jun. 29, 2020

(65) Prior Publication Data

US 2020/0412781 A1 Dec. 31, 2020

Related U.S. Application Data

(63) Continuation-in-part of application No. 16/457,556, filed on Jun. 28, 2019.

(51) Int. Cl.
| | |
|---|---|
| *H04L 65/4053* | (2022.01) |
| *H04L 65/1089* | (2022.01) |
| *H04L 65/401* | (2022.01) |
| *A63F 13/847* | (2014.01) |
| *H04L 9/40* | (2022.01) |
| *A63F 13/822* | (2014.01) |
| *G06F 3/04815* | (2022.01) |

(52) U.S. Cl.
CPC ........ *H04L 65/4053* (2013.01); *A63F 13/822* (2014.09); *A63F 13/847* (2014.09); *H04L 63/20* (2013.01); *H04L 65/1089* (2013.01); *H04L 65/4015* (2013.01); *G06F 3/04815* (2013.01)

(58) Field of Classification Search
CPC .................................................. H04L 65/4053
USPC ....... 434/118; 705/14.53; 703/2, 11; 706/20; 463/42
See application file for complete search history.

(56) References Cited

U.S. PATENT DOCUMENTS

| | | | |
|---|---|---|---|
| 11,218,522 B1 * | 1/2022 | Yerli ........................ G06F 3/011 |
| 2005/0233810 A1 * | 10/2005 | Chiang ..................... A63F 13/57 463/42 |
| 2013/0073387 A1 * | 3/2013 | Heath ..................... G06Q 30/02 705/14.53 |

(Continued)

*Primary Examiner* — Ruay Ho
(74) *Attorney, Agent, or Firm* — HDC Intellectual Property Law, LLP

(57) ABSTRACT

Systems and methods for demonstrating network security products in a virtual conference and providing training to attendees of a network security training session in the virtual conference through the use of gamification are provided. A server generates a dedicated virtual environment for a particular attendee. A three-dimensional (3D) user interface for the virtual conference is presented on a display of the particular attendee, which represents a simulated conference environment with each network security product being demonstrated as a virtual booth represented in the conference environment. A game client causes the particular attendee to navigate in the 3D user interface to a first virtual booth to access a first learning objective relating to demonstration of a first network security product corresponding to the first booth. A progress report, which is maintained by the server, is used to notify regarding other learning objectives that are of potential interest to the particular attendee.

16 Claims, 37 Drawing Sheets

(56) References Cited

U.S. PATENT DOCUMENTS

| | | | |
|---|---|---|---|
| 2015/0134315 A1* | 5/2015 | Sarmiento | G16B 15/20 703/11 |
| 2015/0278158 A1* | 10/2015 | Singh | A63F 13/67 703/2 |
| 2015/0379394 A1* | 12/2015 | Thaler | G06N 3/0454 706/20 |
| 2016/0188875 A1 | 6/2016 | Weast et al. | |

* cited by examiner

400

| TRAINING SESSION | |
|---|---|
| LOGIN | |
| TEAM NAME | |
| TEAM SIZE | 2 |
| TOKEN | P-XXXX |
| LOGIN | |

TRAINING SESSION

WORKSHOP DETAILS

SERVER: LEADER BOARD- WORKSHOP UPDATE

TEAM NAME: ABC

ENVIRONMENT: USERNAME: ABC123
PASSWORD: *******

LINK: http.//13657.123.87.150.12335

| | ATTENDEE | BADGE | RANK | LEARNING OBJECTIVES | SECURITY RATING |
|---|---|---|---|---|---|
| | | * | | | |
| 1. | A | ****** | | 50 | |
| 2. | B | ** | | 25 | |

TECH EXPO PROGRESS REPORT

ADMINISTRATOR PANEL

TRAINING SESSION

| | TEAM | BADGE | RANK | INCIDENT | HIGH SCORE | SECURITY RATING | TOTAL |
|---|---|---|---|---|---|---|---|
| | | * | | | | | |
| 1. | ABC | ****** | | | 500 | | 62 |
| 2. | XYZ | ** | | | 250 | | 32 |

ADMINISTRATOR PANEL

NEW ADMINISTRATOR

USERNAME

TYPE

PASSWORD

CONFIRM PASSWORD

COMMENTS

ADMINISTRATOR PROFILE

E-MAIL ADDRESS

☒ SMS
☒ TWO FACTOR AUTHENTICATION
☒ RESTRICT LOG-IN TO TRUSTED HOSTS

[ OK ]  [ CANCEL ]

STORY BOARD

| EDIT WORKSHOP CONTENT | | TRAINING SESSION | | PRESENT NOTES |
|---|---|---|---|---|
| MAX AUDIT SCORE | TRAINING DURATION | BONUSES: | ANSWER PENALTIES | TEAMS: |
| 500 | 180 MINUTES | [0.2, 0.1] | [0, 0.25, 0.25, 0.25, 0.25] | MIN PLAYER 1 MAX PLAYER 2 TARGET PLAYER 2 |

OBJECTIVES

| 1: BADGE 200 POINTS GO TO RECEPTION | 2: WRATH OF CISO 300 POINTS GO TO CISO'S OFFICE |
|---|---|
| 3: BOARD MEETING - 300 POINTS | |
| | |

| | | |
|---|---|---|
| 1: BADGE | 200 POINTS | GO TO RECEPTION |

YOU HAVE JUST ARRIVED AT THE CUSTOMER SITE TO SOLVE THEIR "PROBLEM", BUT YOU DO NOT HAVE MUCH BACKGROUND.

| | | |
|---|---|---|
| 2: WRATH OF CISO | 300 POINTS | GO TO THE CISO'S OFFICE |

| | | |
|---|---|---|
| 3: BOARD MEETING | 800 POINTS | GO TO THE CISO'S WHITEBOARD |

| | | |
|---|---|---|
| 3: NOC YOUR | 1000 POINTS | GO TO THE NETWORK OPERATION CENTER |

| 1: BADGE | 200 POINTS | GO TO RECEPTION |

YOU HAVE JUST ARRIVED AT THE CUSTOMER SITE TO SOLVE THEIR "PROBLEM", BUT YOU DO NOT HAVE MUCH BACKGROUND.

SET UP RADIUS AUTHENTICATION

INSTRUCTOR NOTES

CLI

SOLUTION

---

LOGIN TO THE CORE WITH FNDN CREDENTIALS

INSTRUCTOR NOTES

CLI

SOLUTION

GAMIFIED VIRTUAL CONFERENCE WITH NETWORK SECURITY TRAINING OF NETWORK SECURITY PRODUCTS

CROSS-REFERENCE TO RELATED APPLICATIONS

This application is a continuation-in-part of U.S. patent application Ser. No. 16/457,556 filed on Jun. 28, 2019, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019-2020, Fortinet, Inc.

BACKGROUND

Field

Embodiments of the present invention generally relate to network security, computer-aided training systems and gamification. In particular, embodiments of the present invention relate to systems and methods for providing effective demonstration of network security products in a virtual conference with network security training sessions for individual attendees or teams of attendees via an improved interactive gaming-style interface and dedicated virtual environment containing a network topology simulating a deployed network of the network security products at issue.

Description of the Related Art

Networking conferences including expos, summits, trade shows, and the like help attendees to connect and share information regarding products or services with others. These conferences also include training sessions from industry leaders and like-minded professionals in order to increase effectiveness in the domain, thereby providing a great way to network and learn more about topics of interest. Traditional, in-person conferences involve logistical hassles on the part of both participants and attendees, including travel, setup, tear-down, and the like.

The transition of large-scale physical conferences to online virtual conferences, without compromising on customer experience or interaction is a challenge. With new and emerging technologies available today, attendees are looking for engaging and accessible digital experience where millions of attendees from across the globe can connect and interact with each other. Interactive training sessions that far exceed the attendance that is possible with in-person events is also a major requirement.

Interactive training sessions are planned programs targeted to modify attitude, knowledge, skill or behavior of individuals to achieve effective performance in an activity or range of activities. Certain training sessions tend to be short programs including learning activities for a specific topic with specific learning outcomes, which are integral part of most professions. These sessions present organizations with an opportunity to expand the knowledge base of their employees so that efficiency of employees is increased and requisite supervision by management is reduced. Therefore, there is a strong consensus on the fact that training sessions are a very important ingredient to increase productivity of the organizations.

There are various kinds of training methodologies, approaches and formats, including coaching/mentoring programs, lectures, group discussions and tutorials and presentations. Coaching/mentoring programs provide employees a chance to receive training one-on-one from an experienced professional where trainees may ask questions and receive thorough and honest answers. Lectures usually take place in a classroom format, where a large amount of information is provided to a number of people in a short amount of time. Group discussions and tutorials allow a group of people to interactively discuss issues. Presentations, films and videos can also be used by the individuals on their own or in conjunction with other training methods.

Existing training methodologies face certain challenges. In many cases, lectures contain no form of interaction between the trainer and the trainee(s) and can be quite monotonous. Coaching/mentoring programs may produce good results by providing one-one one training, however, these programs are not cost-effective to train several individuals. Methods like group discussions and tutorials result in inefficient use of time and resources as typically only a subset of the attendees participate diligently. Learning through presentations, films or videos from outside sources may not touch on issues directly affecting a specific organization, which usually fail to generate interest and participation of the attendees. Furthermore, course formats often focus too much on memorization. For example, in the context of a network security training session, a trainer may share their computer screen to show trainees various configuration screens within a graphical user interface (GUI) of a network security device (e.g., a network management appliance, a firewall appliance, a unified threat management (UTM) appliance, an endpoint security solution enterprise management server, a sandbox appliance, a network security logging, analysis and reporting appliance, and a messaging security appliance, a secure access switch). Such "go here" and "click there" type training sessions are ineffective as the trainees are not engaged and promptly lose much of what was "learned" during the training session.

Also in existing hands-on training sessions, it can be difficult to find a solution for issues that may arise during the training process. Addressing, the types of problem each attendee may encounter and determining where to look for the solution might become cumbersome for the participants as well as the training staff. Moreover, it is difficult to introduce any kind of dynamic change or modification to the training process as the training progresses, especially when there are a large number of attendees representing different skill levels in relation to the subject matter at issue. Also, introduction of such changes may induce logistical challenges (e.g., informing the attendees regarding the changes, the generation of results and evaluation in real time, etc.). Meanwhile, products, such as network security appliances, and their associated features and configurations change constantly. As such, it is difficult to keep the training materials (e.g., content and trainer updates) current.

SUMMARY

Systems and methods are described for demonstrating network security products in a virtual conference and providing training to attendees of a network security training session in the virtual conference through the use of gamification and dedicated virtual environment containing the network security products at issue. According to one embodiment, a server generates a dedicated virtual environment for a particular attendee of various attendees of a network security training session, which is part of a virtual conference demonstrating network security products. The dedicated virtual environment contains a network topology simulating a deployed network of multiple network security devices for which the particular attendee is to receive training. The network security devices are represented by corresponding full-feature virtual network security appliances within a virtual machine network. A game client associated with the particular attendee creates a three-dimensional (3D) user interface for the virtual conference to be presented on a display of a computer system of the particular attendee, which represents a simulated conference environment with each network security product from one or more vendors being demonstrated as a virtual booth represented in the conference environment. The game client causes the particular attendee to navigate in the 3D user interface to a first virtual booth selected from various virtual booths to access a first learning objective relating to a first network security product from a first vendor corresponding to the first booth. The first learning objective involves observing a demonstration regarding the first network security product. The server further maintains progress of the particular attendee for each of the virtual booths on a scoreboard operatively coupled with computer systems of one or more other attendees. The progress is used to notify the particular attendee regarding other learning objectives available within the conference environment determined to be of potential interest to the particular attendee.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5A illustrates an exemplary screen shot of a user interface relating to a scoreboard in accordance with an embodiment of the present invention.

FIG. 5B illustrates an exemplary screen shot of a user interface relating to a leader board in accordance with an embodiment of the present invention.

FIG. 6A illustrates a new administrator screen that may be used by an attendee of a virtual conference in accordance with an embodiment of the present invention.

FIGS. 6B-D illustrate exemplary screen shots of a user interface that may be presented to an administrator of a network security training session in accordance with an embodiment of the present invention.

FIGS. 7A-E represent various modes for managing a network security training session through an administrator device in accordance with an embodiment of the present invention.

DETAILED DESCRIPTION

Figure 1A:
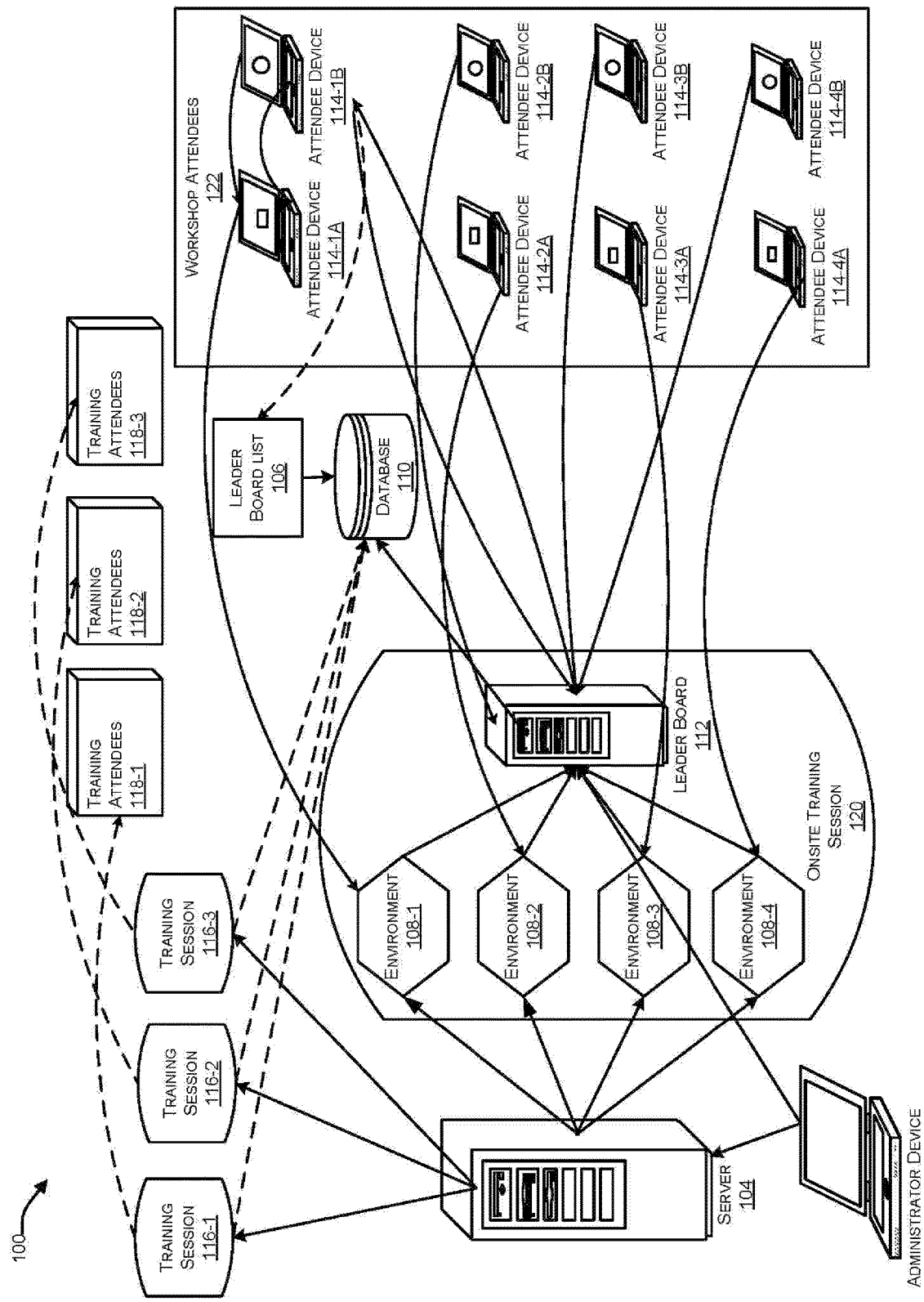
FIGS. 1A-C represent exemplary network architectures in which aspects of the present invention can be implemented in accordance with an embodiment of the present invention.

Systems and methods are described for demonstrating network security products in a virtual conference and providing training to attendees of a network security training session in the virtual conference through the use of gamification and dedicated virtual environments containing the network security products at issue.

In one embodiment, each attendee of a virtual conference (including expos, summits, trade shows, and the like) is provided with an access to their own virtual environment via use of a unique identifier (e.g. login credential, id number, unique alpha-numeric code, etc.). A 3-Dimensional (3D) interface of the virtual environment demonstrates network security products in form of virtual booths of various vendors. Each virtual booth is associated with a learning objective (e.g. video demonstration of the network security product) such that the attendee can learn about the network security product by completing (e.g. watching video) the learning objective.

In some embodiments, a scoreboard may be used to maintain progress of the attendee on various booths to keep a track of what all network security products have been considered by the attendee. The progress can be used to notify the attendee regarding other learning objectives that are of potential interest to him/her. The scoreboard can further be capable of keeping track of all the attendees of the virtual conference, which can help two or more attendees to form a team to participate in various training sessions taking place in the virtual conference. In one embodiment, the maintained progress is linked with the unique identifier of the attendee so that the attendee can access new content whenever certain update is made in the virtual environment or resume from the previously accessed learning-objective to access other objective based on the progress.

In an embodiment, each individual training session attendee (or team of multiple training session attendees) through their dedicated virtual environment is tasked with completing a set of problem-solving objectives (e.g., configuring a firewall appliance or another type of network security device of a particular network security vendor) and potentially a limited amount of time to satisfactorily complete the set of problem-solving objectives. The training session (or game) may follow a narrative of the team being a network security professional for an organization and may be presented in the form of a first-person perspective in which the attendees (players) experience the action through the eyes of the protagonist (e.g., a network security professional). Clues and/or guidance provided within the game client may inform decision making on the part of the teams.

The attendees may be required to complete the current set of problem-solving objectives before unlocking a new set of problem-solving objectives. Similar to an escape room type theme, unlocking a set of problem-solving objectives may allow the attendees to move to a new location within the game environment (from one room/office/area, e.g., the reception, to another, e.g., the office of the Chief Information Security Officer (CISO)), which may contain further clues relevant to the new set of (more advanced) problem-solving objectives. In an online version or training session spanning sufficient time in which players/attendees may have persistent accounts, teams and/or individual attendees may be awarded "experience bars" or "badges" that measure incremental training progress in the form of job titles (e.g., SOC tier 1 analyst I, SOC tier 1 analyst II, SOC tier 2 analyst I, SOC tier 2 analyst II, SOC tier 3 analyst I, SOC tier 3 analyst II, threat intelligence manager, incident response manager, security manager, director of threat intelligence, director of incident response, CISO, or the like) of increasing prestige. In this manner, attendees are rewarded as their skills are built and as they achieve incremental "wins" by completing each new set of problem-solving objectives.

In some embodiments, a leaderboard may additionally be presented or otherwise made available to the participating teams. For example, the leaderboard may receive and publish one or more scores for the participating teams, thereby creating a competitive environment. In this manner, attendees are more engaged as they are motivated to participate and stay on track to complete problem-solving objectives before other teams of attendees. Non-limiting examples of scores that may be used in various embodiments of the present invention include a security rating score (or simply a security rating) and an objective score. The security rating represents a rating that can be generated by a network security device (e.g., a FORTIGATE next generation firewall appliance available from the assignee of the present invention) based on an analysis of the current security posture of the dedicated virtual environment at issue. The objective score is a score determined by the leaderboard based on the list of completed/incomplete problem-solving objectives, where the complete/incomplete objectives are identified to the leaderboard by the network security device.

According to one embodiment, a core (root) network security device within the virtual environment can execute a collection of security checks on one or more other network security devices within the virtual environment. The core (root) network security device and the one or more other network security devices may be part of multiple network security devices associated with a network that are communicatively coupled with each other via a security fabric. In order to commence execution of the collection of security checks, the core (root) network security device may issue a request to one of the other network security devices via the security fabric and in response to the request, the network security device receiving the request can provide configuration data pertaining to each security check (which may also be referred to herein simply as a check, hereinafter) of the collection of security checks via the security fabric.

After obtained the configuration data corresponding to each security check of the collection of security checks, the core (root) network security device can proceed to validate each security check by comparing the corresponding configuration data with a pre-defined or configurable network security configuration recommendation to generate a compliance result in the form of a security posture indicative of a difference in security coverage between the currently implemented network security configuration and the pre-defined or configurable network security configuration recommendation, which may be derived, for example, by translating any or a combination of security, business, internal and/or external audit and compliance requirements or best practices into a desired technical configuration for various security functions, including, but not limited to, audit logging and monitoring, web application security, threat and vulnerability management, security fabric hardening, network design and policy, firmware and subscriptions, endpoint management, data protection, and application security). Further details regarding determination of a security rating of a network element are available in co-pending U.S. patent application Ser. No. 16/358,433, filed on Mar. 19, 2019, which is hereby incorporated by reference in its entirety for all purposes.

In some embodiments, the trainer (also referred to herein as the workshop administrator, administrator or instructor) can be provided with the ability to dynamically change the storyboard, thereby creating elements of uncertainty and enabling the workshop administrator to tailor (e.g., increase or decrease the number, type and/or complexity of problem-solving objectives) the training session to the appropriate level of skill represented among the trainees and/or time available for the training session. The workshop administrator may also be provided with the ability to reward or penalize a team (e.g., for showing problem-solving creativity and/or for breaking training session rules, respectively).

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a processing resource (e.g., a general-purpose or special-purpose processor) programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security fabric" refers to a combination of hardware and software elements of a network that deliver protection and visibility to multiple network segments, devices, and appliances. The devices and appliances may be physical, virtual, in the cloud, or on-premises. The security fabric may also provide the ability to automatically synchronize security resources to enforce policies, coordinate automated responses to threats detected in the network, and easily manage different security solutions and products through a single console.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

According to a various embodiments of the present disclosure, a virtual conference for demonstrating network security products along with training sessions for individual training of attendees (or a team of attendees) via interactive gaming style interface and dedicated virtual environment containing the network security products at issue is provided. The server generates a dedicated virtual environment for a particular attendee of various attendees of a network security training session, which is part of a virtual conference demonstrating network security products. The dedicated virtual environment contains a network topology simulating a deployed network of multiple network security devices for which the particular attendee is to receive training. The network security devices are represented by corresponding full-feature virtual network security appliances within a virtual machine network.

A game client associated with the attendee creates a 3D user interface for the virtual conference to be presented on a display of a dedicated video game console (e.g., Xbox, PlayStation, Nintendo or the like) or general purpose computer system (e.g., a tablet computer, a laptop computer, a desktop computer or the like) used by the attendee. Herein the term "computer system" is intended to broadly encompass any of the various types of computers, including, but not limited to general purpose computer systems (e.g., personal computers, workstations, and minicomputers), smart devices, as well as dedicated video game consoles and the like. The 3D user interface represents a simulated conference environment with each network security product from one or more vendors being demonstrated as a virtual booth represented in the conference environment. The game client causes the attendee to navigate in the 3D user interface to a particular virtual booth to access a learning objective (which can be a demonstration video of the network security product at issue) relating to a particular network security product from a vendor corresponding to the particular virtual booth. The learning objective therefore involves observing a demonstration regarding the particular network security product.

According to an embodiment, the server uses a scoreboard, which is operatively coupled with computer systems of one or more other attendees to maintain progress of each attendee on the virtual booths. The progress is used to notify the attendee regarding other learning objectives available within the conference environment that can be of potential interest to the attendee.

In one embodiment, the server enables the attendee or a team of attendees of the virtual conference to access the network training session through the game client presented on the display of the dedicated video game console or the general purpose computer system. The game client retrieves a set of problem-solving objectives for network security training session based on a current game state (i.e., the leaderboard server's game state for the particular game client). Through the administrator's device an administrator can access the leaderboard or use the storyboard editing tool to dynamically change the current game state, for example, to match a presented problem-solving objective with the skill level of the attendees. A problem-solving objective is revealed or otherwise presented via a display of a computer system. The problem-solving objective may become apparent via interactions with one or more characters in the game, via interactions with one or more objects (e.g., computer systems, documents, map, and the like) in the game, and/or after the attendee follows various guidance/clues that may be scattered throughout the game environment or revealed by the above-described interactions). In the context of a network security training, a non-limiting example of a problem-solving objective is configuring a network security device in a particular manner. Real and/or simulated interactions are facilitated by the game client of the attendee with network security device in connection with attempts by attendee to complete the problem-solving objective based on clues and/or guidance provided by game client.

According to an aspect, the game client presents the guidance until the set of problem-solving objectives is achieved by attendee and the guidance is dynamically updated based on attempts by the attendee. Upon completion of the problem-solving objective by the attendee, the environment (e.g., one or more of the network security devices) associates a rating (e.g., a security rating score) with the attendee based on attendee's performance represented, for example, by the current security posture of the dedicated virtual environment. The rating is then displayed on a leaderboard that is coupled with instances of the game client associated with the corresponding attendees of the team. Based on a current state of the game, the game client causes a second problem-solving objective to be revealed or otherwise presented to the attendee.

Figure 1B:
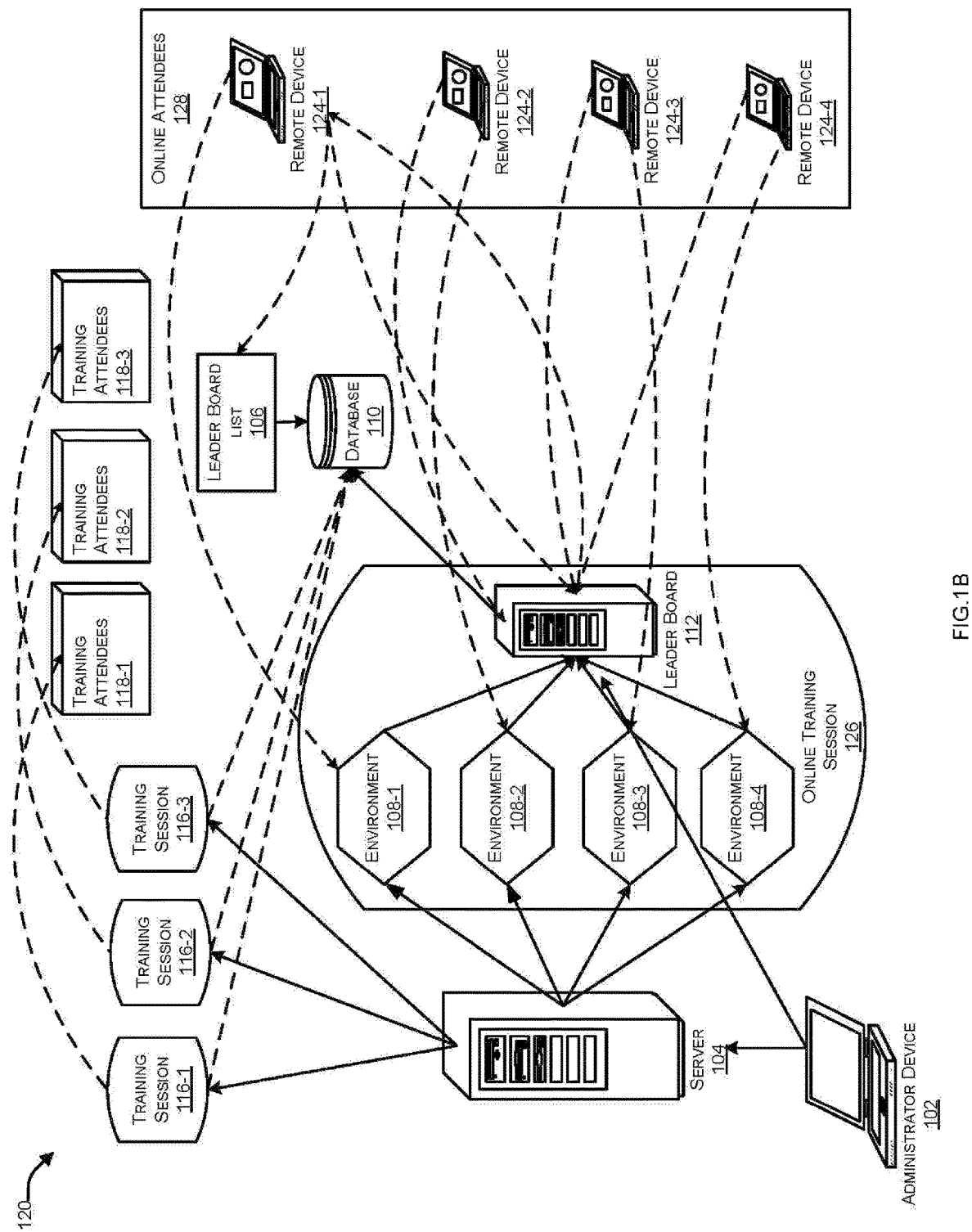
Figure 1C:
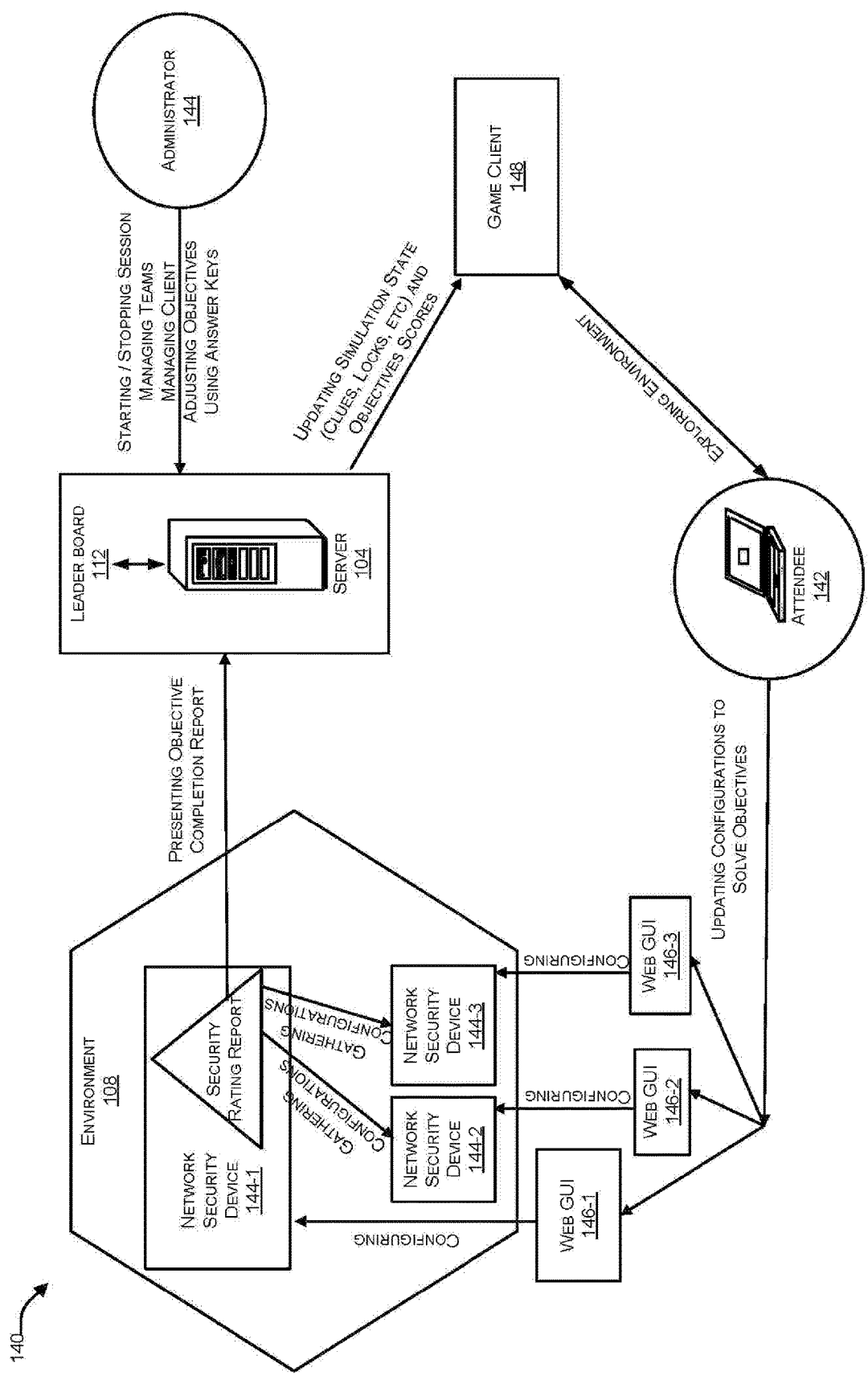

FIGS. 1A-C represent exemplary network architectures in which aspects of the present invention can be implemented in accordance with an embodiment of the present invention. In the context of architectures 100 and 120, a server 104 implemented in a cloud based network environment may be used by an administrator for creation, initialization and destruction of multiple online and/or onsite network security training sessions 116-1, 116-2 and 116-3 for respective training attendees 118-1,118-2 and 118-3, including environment 108 and leaderboard 112.

According to an embodiment, training sessions 116-1, 116-2 and 116-3 can be part of a virtual conference that demonstrates network security products from various vendors. The virtual conference can be represented by a simulated conference environment where each network security product is demonstrated as a virtual booth and training attendees 118-1,118-2 and 118-3 can navigate in the virtual environment to access learning objectives (e.g. a video of demonstration of the network security product) of corresponding virtual booth. Server 104 uses a scoreboard to maintain progress of a particular attendee for each of the virtual booths so that the progress is used to notify the particular attendee regarding other learning objectives available within the conference environment, which can be of potential interest to the particular attendee. The scoreboard or the 3D user interface is used to enter into training sessions 116-1, 116-2 and/or 116-3.

According to one embodiment, leaderboard 112 controls the state of the various instances of the game client (e.g., the game server) and also hosts the web application (web server) presenting a leaderboard display and various administrator interfaces (e.g., a storyboard editing tool (which may be referred to herein simply as the storyboard), team summary and administrator panel). The administrator may use an administrator device 102 coupled environment 108 to access the storyboard to view/edit configuration information associated with the flow of the training game as well as view/edit the leaderboard server's game to facilitating network security training of training attendees 118-1, 118-2 and 118-3.

Training sessions 116-1,116-2 and 116-3 are associated with a database 110 coupled to a leader board 112 to provide a leader board list 106 with current statistics and scores for all participating teams based on receipt of real-time information (e.g., in the form of a security rating report or an objective completion report) from a core (root) network security device (e.g., a network gateway) within the virtual environment that gathers configuration information from other virtual network security devices in the virtual environment as described further below. As noted above, the security rating report may represent a rating generated by the core (root) network security device based on its analysis of the current security posture of the dedicated virtual environment at issue. Meanwhile, the objective completion report may represent a list of the problem-solving objectives with an indication of which have been completed and which have not been completed. In one embodiment, this objective completion report is used by the leaderboard to calculate an objective score by, for example, aggregating the point values for all of the completed objectives.

According to an implementation, architecture 100 represents an example of an onsite network security training session 120, in which multiple virtual environments 108-1, 108-2, 108-3, and 108-4 (which may be individually referred to herein as an environment 108 and may be collectively referred to as environments 108) are generated by server 104 to provide network security training to workshop attendees 122 through attendee devices 114-1A, 114-1B, 114-2A, 114-2B, 114-3A, 114-3B, 114-4A, 114-4B (which may be referred to herein individually as attendee device 114 and collectively as attendee devices 114).

In one embodiment, workshop attendees 122 may participate in teams, for example, attendee devices 114-1A and 114-1B may be used by a two member attendee team 114-1 (not shown) and similarly, attendee devices 114-2A and 114-2B may be used by another two member attendee team 114-2 (not shown). In the present example, each environment 108 associated with onsite training session 120 is a dedicated virtual environment for an attendee or team of attendees of workshop attendees 122. For example, environment 108-1 may be associated with attendee devices 114-1A and 114-1B and environment 108-2 may be associated with attendee devices 114-2A and 114-2B. Further, attendee devices of each team may be coupled with each other to access the corresponding environment of the team. For example, attendee devices 114-1A and 1141B may be coupled with each other such that both attendee devices 114-1A and 1141B may access environment 108-1.

In an embodiment, in an onsite network security training session, workshop attendees 122 can take part in a single session during the entire network security training event. Alternatively, the network security training event may comprise multiple sessions. In one embodiment, a championship variant is provided in which the highest scoring attendees for each session are invited back to attend a final 'championship' round.

According to an implementation, architecture 120 illustrates an example of an online network security training session 126, which is part of a virtual conference. Multiple environments 108-1, 108-2, 108-3, and 108-4 are generated by server 104 to enable online attendees 128 to participate in the virtual conference through remote devices 124-1,124-2, 124-3 and 124-4 (which may be referred to herein individually as remote device 124 and collectively as remote devices 124). Each environment 108 of online training session 126 is a dedicated virtual environment for a remote attendee device 124 of online attendees 128. Online attendees 128 can have persistent accounts with unique identifiers (e.g. login credentials, unique alphanumeric code, id numbers, etc) so that their progress can span across multiple virtual booth and training sessions of the virtual conference. The use of unique identifiers enables the attendee to resume the virtual conference from the last accessed learning-objective.

According to an embodiment, a game client creates a 3D user interface for the virtual conference to be presented on remote device 124 of a particular attendee, which represents a simulated conference environment with each network security product of the various network security products from one or more vendors demonstrated as a virtual booth of a multiple virtual booths represented in the conference environment. The game client causes the particular attendee to navigate in the 3D user interface to a particular virtual booth to access a learning objective relating to a network security product from a vendor corresponding to the particular virtual booth. The learning objective involves observing a demonstration (e.g. video) regarding the network security product. Server 104 further uses a scoreboard (which is coupled with remote devices 124 and can be part of leaderboard 112) to maintain progress of attendees 128 for each of the virtual booths. The progress is used to notify the attendees 128 regarding other learning objectives available within the conference environment determined to be of potential interest to them. The conference environment can allow online attendees 128 (individually or in teams) to access online training sessions.

In the context of architecture 140, a data flow is shown between various components of a network that facilitates training of one or more attendees 142 (which may be referred to herein individually an attendee 142), which correspond to workshop attendees 122 and/or online attendees 128. An administrator 144 can access a storyboard displayed on administrator device 102. A game client 148, connected to leader board 112, provides a simulated environment to connected attendees 142. Attendees 142 through respective attendee devices can participate in onsite training session 120 or online training session 126 through corresponding dedicated virtual environments 108 generated by server 104 for each attendee 142. Each attendee 142 can access respective virtual environment 108 using a token. Virtual environment 108 can provide a network topology simulating a deployed network of multiple network security devices 114-1, 114-2 and 114-3 (e.g., of a particular network security vendor) for which attendees 142 are to receive training. In one embodiment, network security devices 114-1, 114-2 and 114-3 may be represented by corresponding full-feature virtual network security appliances within a virtual machine network.

In an embodiment, virtual environment 108 may be associated with a simulated environment or game client 148, which is associated with attendee 142. Game client 148 causes a three-dimensional (3D) game interface for a game to be presented to attendee 142 on a display of a computer system (e.g., a tablet computer, a laptop computer, a desktop computer or the like) being used by attendee 142. In an example, the 3D game interface represents an office environment through which attendee 142 can navigate. In one embodiment, the game interface is in the form of a first person shooter (FPS) style game and follows an "escape room" theme in which as objectives are completed, rooms unlock. Those skilled in the art will appreciate this is simply one non-limiting example of a particular combination of various possible game styles and game themes. In other embodiments, other game styles and game themes may be employed for the game interface.

According to an embodiment, game client 148 retrieves a set of problem-solving objectives for the network security training session at issue based on the current state of the training game as stored within leaderboard 112 and which is fully configurable via administrator device 102. Next, a first objective of the retrieved set of problem-objectives is presented on the display of the attendee device. The users may be required to discover the first problem-solving objective using a computer screen inside the simulated office environment. In the context of the example game scenario described herein, the first objective involves configuring a first network security device, e.g., network security device 144-1, in a particular manner. For example, the first objective may be to log into the virtual environment as an unprivileged user, and add a Remote Authentication Dial-In User Service (RADIUS) administrator account.

In one embodiment, game client 148 provides a link to actual real web interfaces of corresponding full-feature virtual network security appliances (e.g., network security devices 144-1, 144-2 and 144-3) within a virtual machine network. As such, the problem solving objectives involve attendees 142 interacting with and configuring real virtual network security appliances within a game environment. In alternative embodiments, game client 148 may provide simulated interactions with network security devices 144-1, 144-2 and 144-3.

Continuing with the present example, game client 148 may provide attendee 142 guidance to attendee 142 in connection with their attempts to complete the first problem-solving objective. For example, with respect to the first problem solving objective, attendee 142 can attempt to configure network device 144-1 through web GUI 146-1 based on guidance provided in game client 148. For example, the simulation UI may provide the users with a detailed network topology diagram and virtual device access information and credentials. In one embodiment, the guidance provided may be in the form of clues that may be scattered throughout the game environment. Such guidance may be provided until a set of problem-solving objectives is completed by attendee 142 and may be dynamically updated based on one or more failed attempts by attendee 142 to complete the problem solving objective.

According to an embodiment, upon completion of the first problem-solving objective by attendee 142, one or more scores are generated for the attendee 142. The scores may include or be based upon a rating (e.g., a security rating) that is associated with attendee 142 by network security device 144-1 and/or an objective score for the attendee 142. In one embodiment, the security rating may be based on a security posture of the dedicated virtual environment being configured by attendee 142. As noted above, the objective score may be modified by bonuses and/or deductions resulting from an amount of time to complete the first problem-solving objective and a degree of accuracy associated with completion of the first problem-solving objective. In any event, the one or more scores are then displayed on leaderboard 112 that is coupled to game client 148. In an example, based on one or more of the scores or ratings, game client 148 can update the simulation state or guidance for attendee 142 to increase/decrease the difficulty by providing more or fewer clues, locking or unlocking various areas/rooms/mechanisms within the office environment etc. Further, on completion of the first problem-solving objective, game client 148 may retrieve a second problem solving objective of the set of problem-solving objectives to be displayed on attendee's computer system directing attendee 142 to, for example, configure a second-network security device in a particular manner.

As with the first problem-solving objective, attendees 142 may need to find and follow one or more clues to discover the second problem-solving objective, which may require further interactions with the actual real web interfaces of the corresponding full-feature virtual network security appliances (e.g., network security devices 144-1, 144-2 and 144-3) using another computer screen somewhere within the simulated office environment. For example, attendee 142 may be required to configure network security device 144-2 through respective GUI 146-2. Those skilled in the art will appreciate that in the context of an escape room theme the first set of problem-solving objectives may be presented in a first room/office represented within the office environment and one or more of the first set of problem-solving objectives may be required to be completed before the first room/office is "unlocked" and the attendee 142 is free to explore one or more other areas, rooms and/or offices of the office environment to discover clues relating to subsequent objectives.

In addition, as described in further detail below, various tools are provided for an administrator or instructor to monitor, customize, manage and/or control the network security training session as well as the attendees 142 and teams. For example, administrator 144 can obtain leader board scores through a team summary view presented on administrator device via a browser-based interface. Based on the ratings displayed on leaderboard 112 or independently of such ratings, administrator 144 may update storyboard to, among other things, adjust objectives (e.g., increasing or decreasing the complexity and/or number of objectives in accordance with the skill levels of attendees 142) and/or clarify wording of the various problem solving objectives. In one embodiment, the storyboard also provides answer keys to instructors so they can assist attendees 142.

Figure 2:
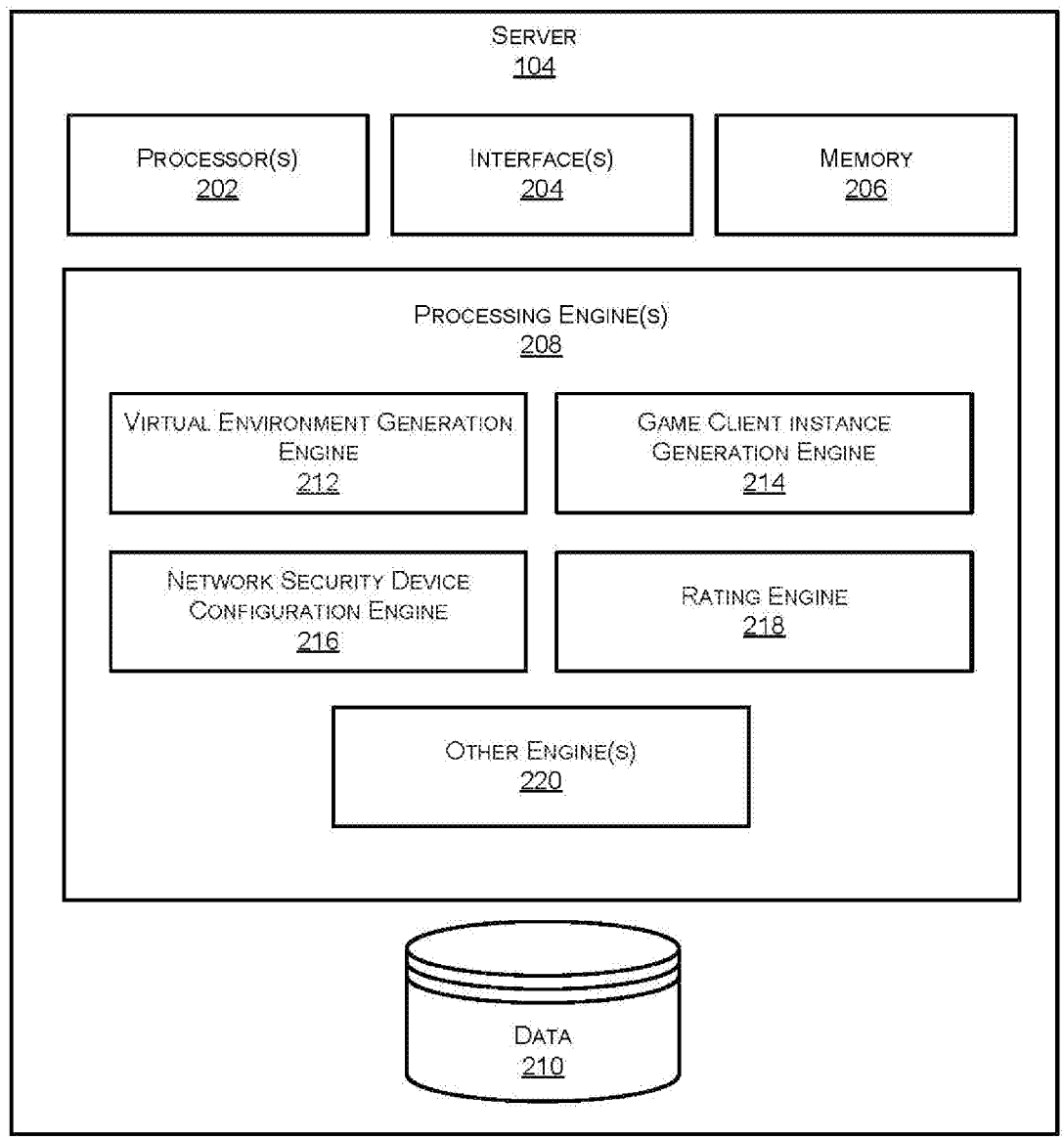
FIG. 2 is a block diagram illustrating functional components of a server in accordance with an embodiment of the present invention.

FIG. 2 is a block diagram illustrating functional components of a server 200 in accordance with an embodiment of the present invention. As illustrated, server 200 can include one or more processing resources (e.g., processor(s) 202). Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 206. Memory 206 can store one or more computer-readable instructions or routines, which may be fetched and executed to create or share the data units over a network service. Memory 206 can include any non-transitory storage device including, for example, volatile memory such as RAM, or non-volatile memory such as EPROM, flash memory, and the like. In an example embodiment, memory 206 may be a local memory or may be located remotely, such as a server, a file server, a data server, and the Cloud.

The server 200 can also include one or more interface(s) 204. Interface(s) 204 may include a variety of interfaces, for example, interfaces for data input and output devices, referred to as I/O devices, storage devices, and the like. Interface(s) 204 may facilitate communication of server 200 with various devices coupled to server 200. Interface(s) 204 may also provide a communication pathway for one or more components of server 200. Examples of such components include, but are not limited to, processing engine(s) 208 and data 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, server 200 can include the machine-readable storage medium storing the instructions and the processing resource to execute the instructions, or the machine-readable storage medium may be separate but accessible to server 200 and the processing resource. In other examples, processing engine(s) 208 may be implemented by electronic circuitry. Data 210 can include data that is either stored or generated as a result of functionalities implemented by any of the components of processing engine(s) 208.

In an example, processing engine(s) 208 can include a virtual environment generation engine 212, a game client instance generation engine 214, a network security device configuration engine 216, a rating engine 218 and other engine(s) 220. Other engine(s) 220 can implement functionalities that supplement applications or functions performed by server 200 or processing engine(s) 208. While in the context of the present example, processing engines 208 are shown as being associated with server 200, in other embodiments, the various engines may be distributed among various other computer systems within the architectures depicted in FIGS. 1A-C. For example, leaderboard 112, game client 148, and/or network security device 114-1 may implement one or more of the various engines.

In an aspect, virtual environment generation engine 212 generates a dedicated virtual environment for each attendee of a network security training session, which is part of a virtual conference demonstrating network security products. The dedicated virtual environment can contain a network topology simulating a deployed network of multiple network security devices for which the attendees or teams of attendees are to receive training. In an example, each attendee can be associated with a unique identifier (e.g. login credential, id number, unique alphanumeric code, etc.) so that one or more attendees can use corresponding unique identifiers to form a team of attendees.

Attendees of the virtual conference can access the dedicated virtual environment through their devices. In one embodiment, network security devices are represented by corresponding full-feature virtual network security appliances within a virtual machine network and attendees interact with the network security devices via actual real web interfaces of the network security devices. Non-limiting examples of the virtual network security devices include network gateways, next generation firewall appliances, messaging security appliances, client endpoint management systems (EMSs), web application firewall appliances, network security management appliances, network security reporting, logging and/or analyzing appliances, wireless security appliances, clients running endpoint protection software, sandbox appliances, and unified threat management (UTM) appliances.

According to an example, the dedicated virtual environment can be hosted on either a public cloud or a private cloud environment. Within each virtual environment, an entire virtual machine network can be present and represent a simulated deployed network topology including multiple network security devices.

In an embodiment, virtual environment generation engine 212 causes a game client to generate a three-dimensional (3D) user interface for the virtual conference to be presented on a display of a computer system of a particular attendee. The 3D user interface can represent a simulated conference environment with each network security product of multiple network security products from one or more vendors being demonstrated as a virtual booth of a various virtual booths represented in the conference environment. The game client can cause the particular attendee to navigate in the 3D user interface to a first virtual booth selected from the multiple virtual booths to access a first learning objective relating to a first network security product from a first vendor corresponding to the first booth. The first learning objective can involve observing a demonstration regarding the first network security product.

In an embodiment, virtual environment generation engine 212 maintains progress of the particular attendee for each of the multiple virtual booths on a scoreboard operatively coupled with computer systems of one or more other attendees. The progress can be used to notify the particular attendee regarding other learning objectives available within the conference environment determined to be of potential interest to the particular attendee. In one embodiment, the maintained progress can be linked with the unique identifier of the attendee so that the attendee can access new content whenever certain update is made in the virtual environment or resume from the previously accessed learning-objective to access other objective based on the progress.

In an embodiment, the generated virtual environment can enable interaction between the particular attendee and one or more other attendees using a scoreboard represented in the 3D user interface, which may allow one or more attendees to form teams using their respective unique identifiers for participating in a training session through the 3D user interface of the virtual environment.

In an aspect, game client instance generation engine 214 generates a game client or simulated environment associated with attendee on a first team. Game client can cause a 3D game interface for a game to be presented to attendee on a game console or computer system that is used by attendee. The game interface represents an office environment and attendee can navigate within provided office environment. A token can be provided to the attendee for accessing 3D game interface. Upon the 3D game being played, a browser-based interface displayed on the administrator's device can allow the administrator to access leaderboard 112 to alter various game scenarios, objectives and/or simulated interactions for the training session attendees. The game client can retrieve a problem-solving objective for the network security training session based on the current state of the training game and present the objective on the display of the computer system being used by the attendee.

One non-limiting example of a problem-solving objective comprises configuring a network security device in a particular manner. In an embodiment, network security device configuration engine 216 allows the game client to facilitate real or simulated interactions by attendee with the network security device in connection with one or more attempts by attendee to complete the problem-solving objective based on guidance or clues, for example.

In an aspect, in order to assist the training session attendee in connection with completing the problem-solving objectives, guidance and/or clues may be provided in the course of interactions with various characters within the game environment and/or interactions with computer systems, documents, maps, and the like within the game environment. The guidance provided may be dynamically updated based on one or more failed attempts at completion of one or more problem-solving objectives by the attendee.

In an aspect, responsive to completion of a problem-solving objective by attendee, rating engine 218 determines and associates a rating with attendee's performance. The rating may be based on metrics with parameters like an amount of time taken to complete the problem-solving objective and a degree of accuracy associated with completion of the problem-solving objective. Rating engine 218 can be operatively coupled with a leaderboard such that the determined ratings can be displayed to all attendees via the leaderboard.

In one embodiment, before the training session starts, attendees may download the game to their computer systems. After launching the game, attendees are prompted to enter a leaderboard token to access the training session. At this point the game client (simulation) identifies the matching leaderboard in the cloud and the leaderboard responds to the game client with basic information, including the fact that the session has not yet started.

FIGS. 3A-I illustrate exemplary screen shots of a user interface that may be presented to attendees of a virtual conference to learn about network security products in accordance with an embodiment of the present invention.

Figure 3A:
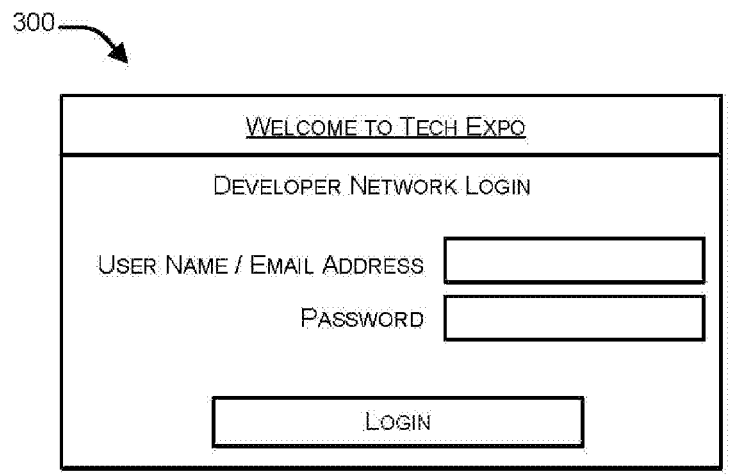
FIGS. 3A-I illustrate exemplary screen shots of a user interface that may be presented to attendees of a virtual conference to learn about network security products in accordance with an embodiment of the present invention.

FIG. 3A depicts a screen shot 300 containing a login screen for an attendee of a virtual conference in accordance with an embodiment of the present invention. The kiosk login screen prompts the attendee to provide unique identifier in the form of login credentials (e.g., username/email address and password). In an exemplary embodiment, each attendee can be provided with a V-token or a virtual ticket so that the attendees can use V-tokens or virtual tickets to form a team to participate during training sessions. Upon entering the information, the attendee can use the login button to transfer the information to the scoreboard (which may be included in a leaderboard), which can then assign a virtual environment to the attendee and can send all relevant information to game client associated with the attendee. In one embodiment, after completing the login information, the kiosk presents a 3D user interface an example of which is illustrated in FIG. 3B.

Figure 3B:
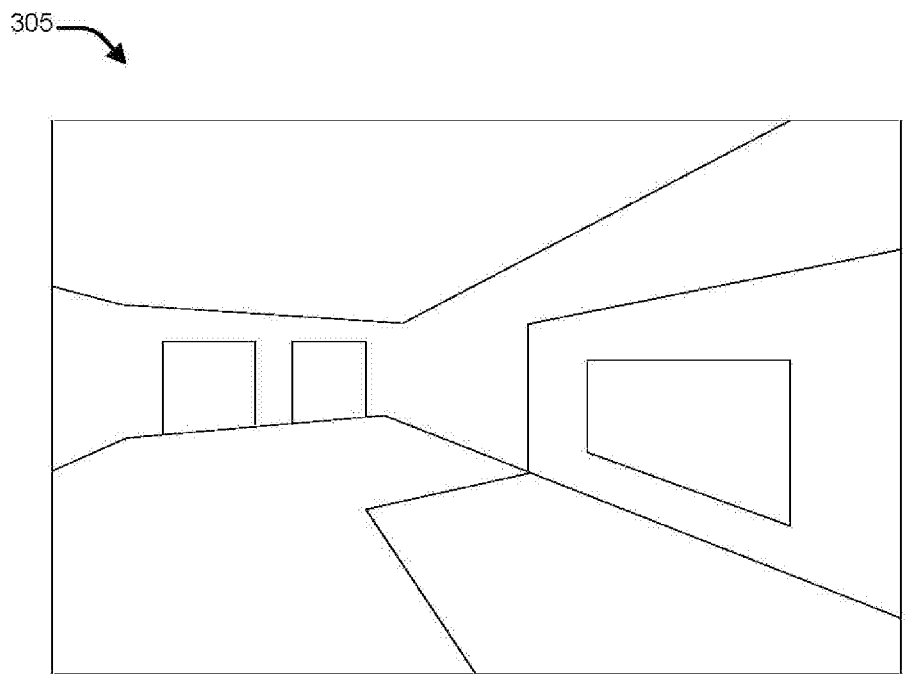

FIG. 3B depicts a screen shot 305 of an exemplary 3D user interface depicting a welcome room in which attendees are initially placed before entering conference area in accordance with an embodiment of the present invention. In this welcome room, the attendees may use a welcome screen to receive a welcome note and information regarding various features/aspects of the environment and training sessions. Various attendees of the conference can interact with each other while waiting to enter in the conference area depicted in FIG. 3C.

Figure 3C:
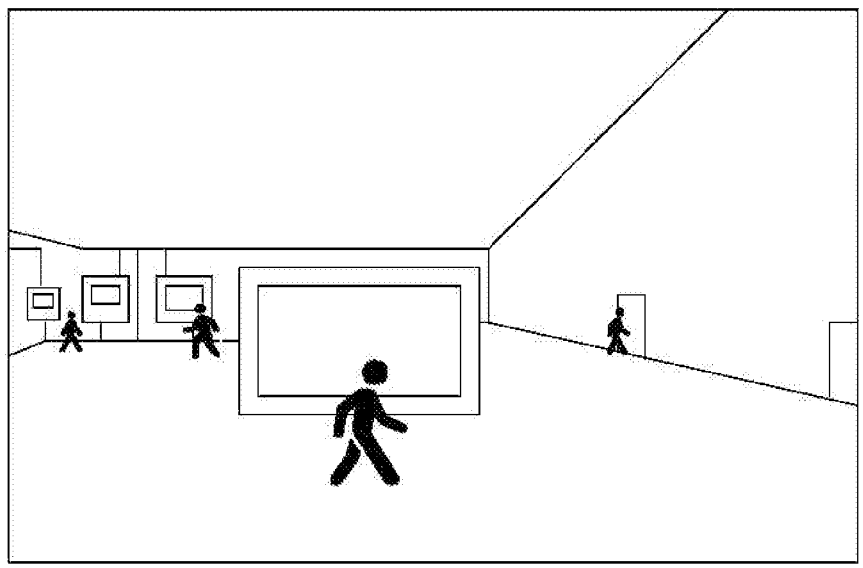

FIG. 3C depicts a screen shot 310 of an exemplary 3D user interface depicting a conference area in accordance with an embodiment of the present invention. In the conference area, multiple booths can represent demonstrations of network security products from various vendors. The attendee can access the booths, which are of interest to them in order to learn about the corresponding network security product. The conference area also depicts doors, which can enable access to one or more training session rooms as depicted in FIG. 3G and one or more special purpose rooms as depicted in FIG. 3I.

Figure 3D:
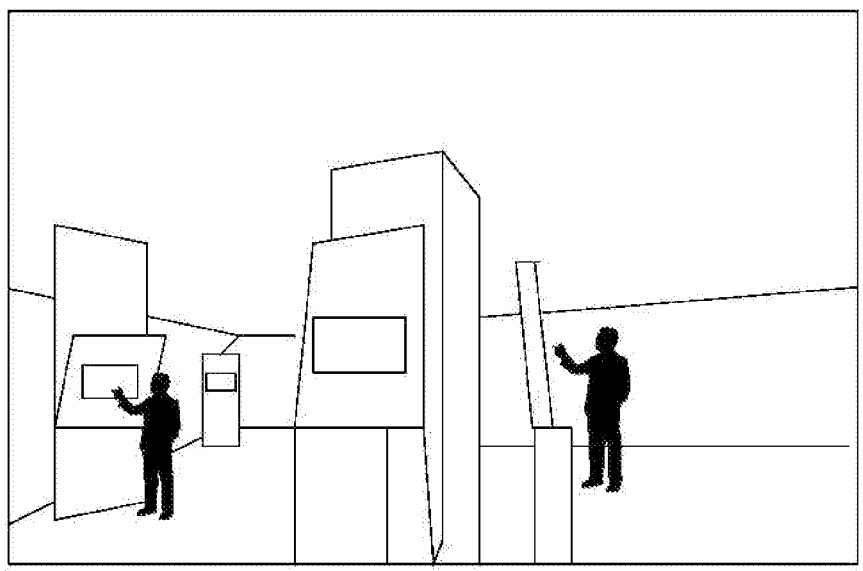

FIG. 3D depicts a screen shot 315 of an exemplary 3D user interface depicting a conference area, in which attendees access the virtual booths in accordance with an embodiment of the present invention. In the conference area, the attendees may use a specific booth to learn about associated network security products of a vendor. When a particular attendee accesses a particular booth, a video may be played to demonstrate details of a network security product as depicted in FIGS. 3E and 3F.

Figure 3E:
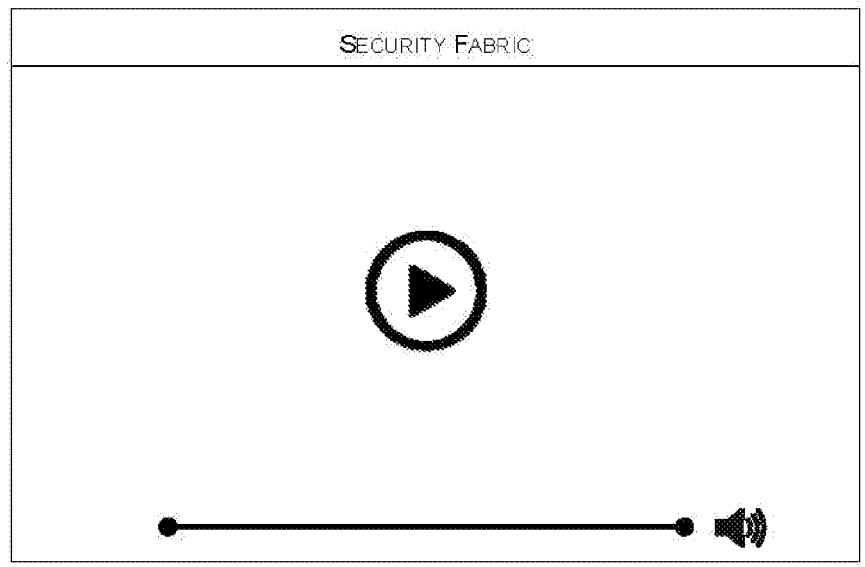
Figure 3F:
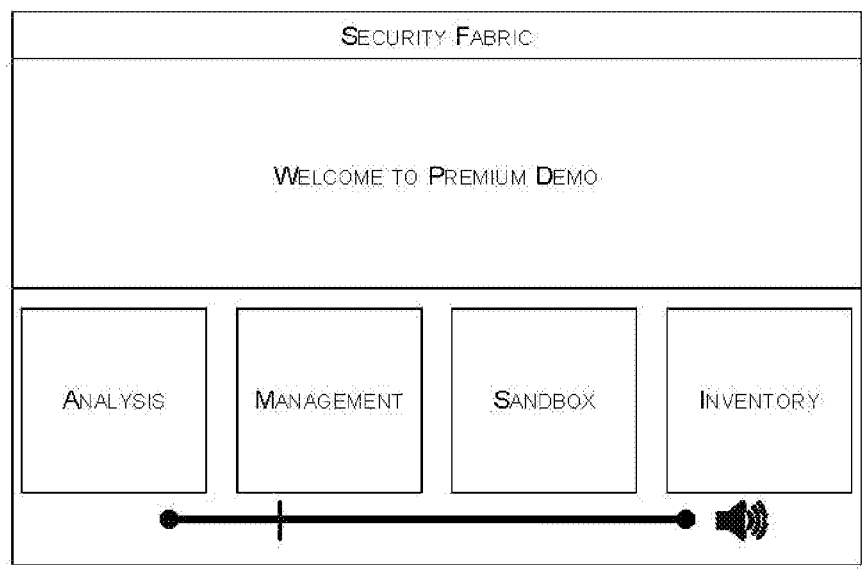

FIGS. 3E and 3F depict screen shots 320 and 325 of an exemplary 3D user interface depicting a learning objective in accordance with an embodiment of the present invention. The attendee may play a video represented on a booth to complete a learning objective relating to a network security product from a vendor corresponding to the booth. The learning objective can involve observing a demonstration regarding the network security product to enable the attendee to gain information regarding the network security product.

Figure 3G:
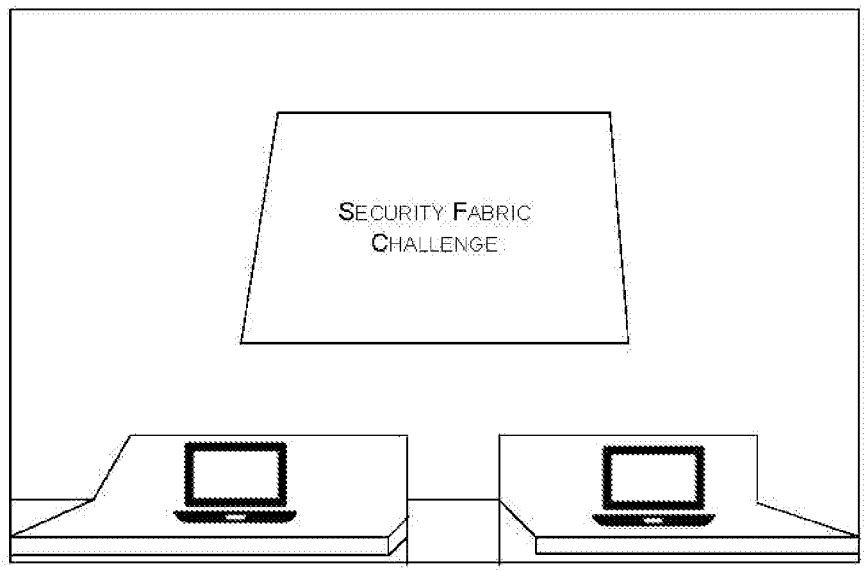

FIG. 3G depicts a screen shot 330 of an exemplary 3D user interface depicting a training session room in accordance with an embodiment of the present invention. In the training session room, the attendees can access a game client to receive network security training via a gamified network security training session. In an example, one or more attendees can form a team using their unique identifiers to participate in the network security training session. Once the attendees or the teams of attendees are ready for the network security training session, the attendees or the teams of attendees can access the screen as depicted in FIG. 3H.

Figure 3H:
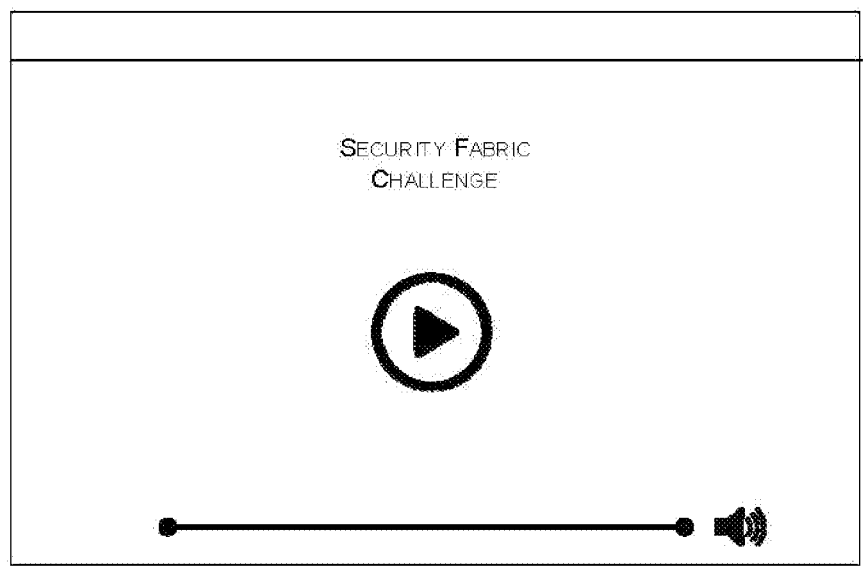
Figure 3I:
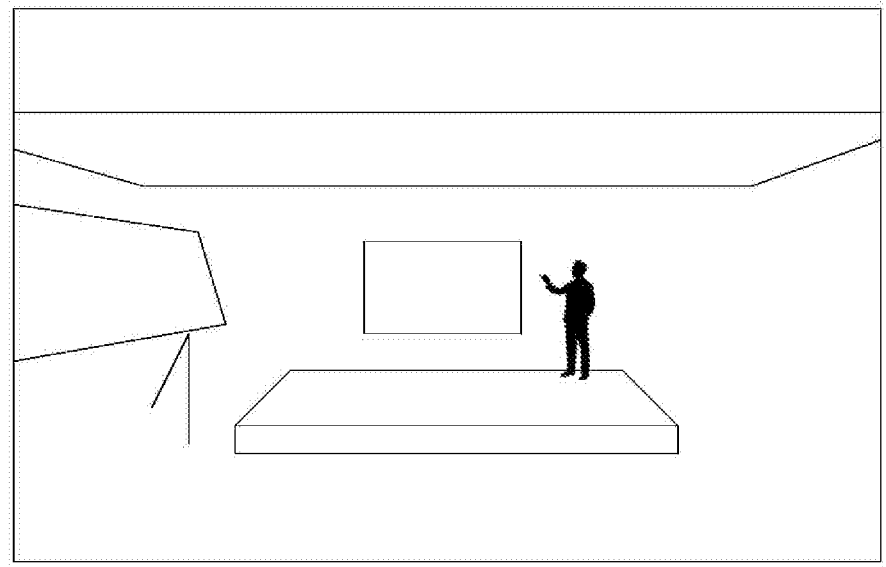
Figure 4C:
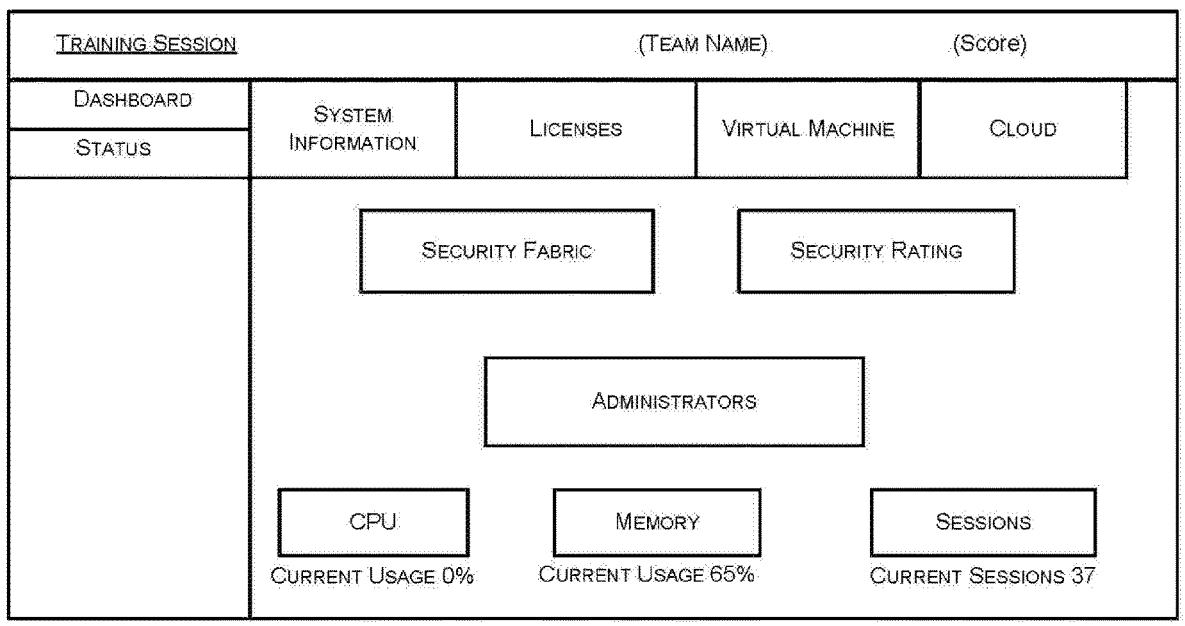
FIGS. 4A-N illustrate exemplary screen shots of a user interface that may be presented to attendees of a network security training session in accordance with an embodiment of the present invention.
Figure 4D:
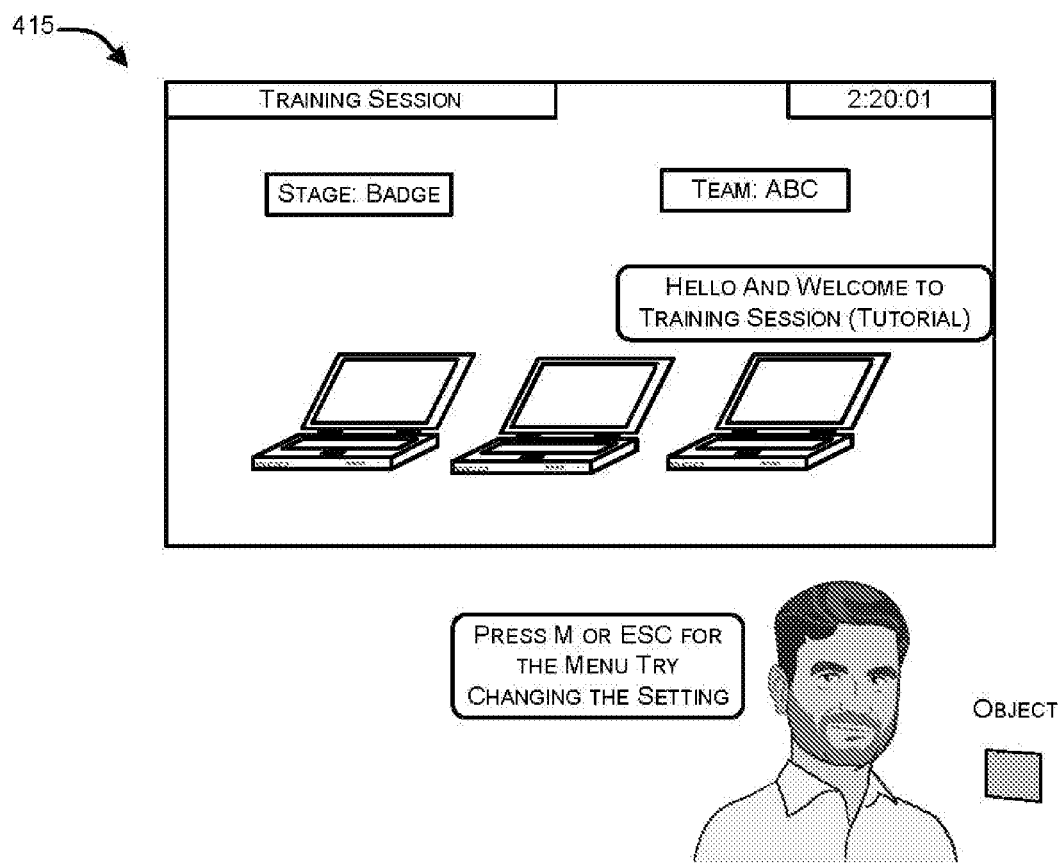
Figure 4E:
Figure 4E:
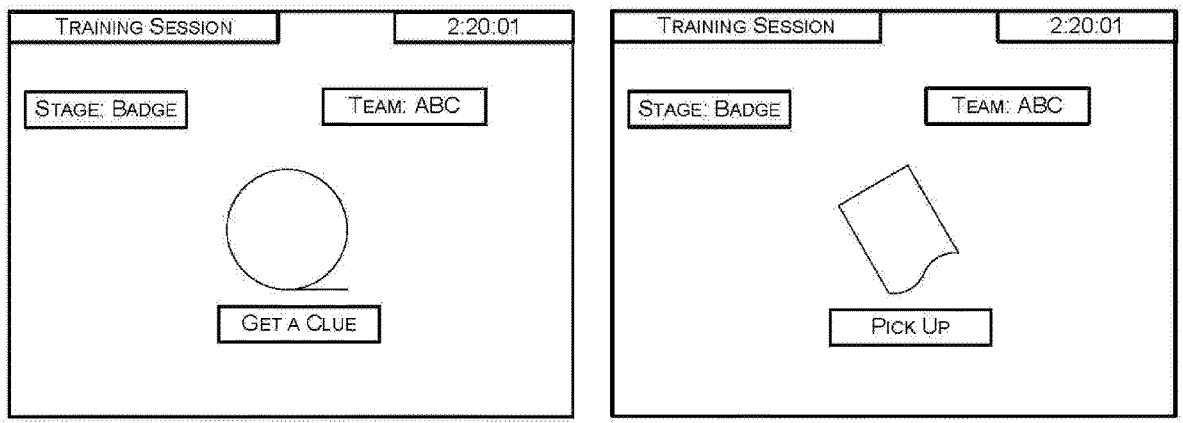

FIG. 3H depicts a screen shot 335 of an exemplary 3D user interface depicting a network security training session in accordance with an embodiment of the present invention. The attendee or a team of attendee can access the network security training session through a game client, which can retrieve the problem-solving objectives, that comprises configuring of network security devices in a particular manner. Exemplary screen shots of a user interface that may be presented to attendees of a network security training session are depicted in FIGS. 4A-N.

FIG. 3I depicts a screen shot 340 of an exemplary 3D user interface depicting a special purpose room in accordance with an embodiment of the present invention. The special purpose room can be used by attendees of the virtual conference to access knowledge and skill based training sessions (e.g., in the form of video lectures) from industry leaders and eminent professionals. The special purpose room can therefore support knowledge sharing among attendees and professionals.

Figure 4F:
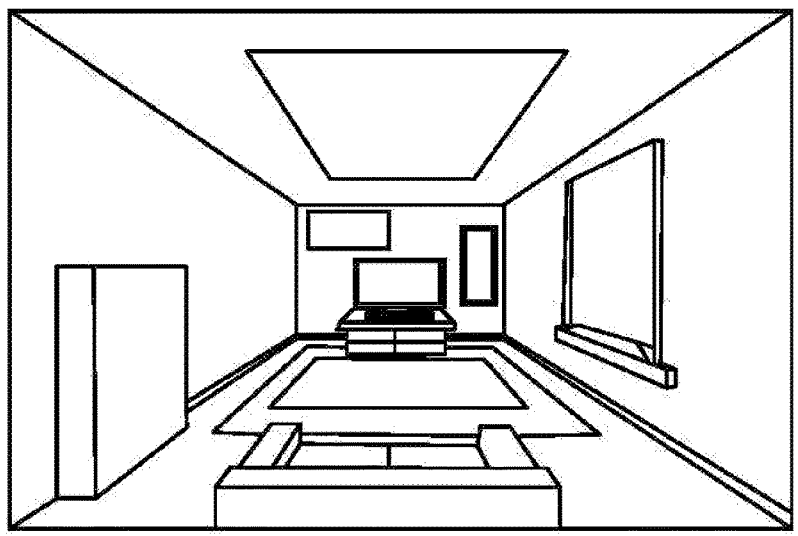

FIG. 4F depicts a screen shot 425 of an exemplary 3D game interface depicting a holding room in which attendees are initially placed until the game starts in accordance with an embodiment of the present invention. In this holding room, the attendees may use a screen of the depicted computer system to receive tutorials regarding various features/aspects of the environment and game. Once all or most of the attendees are connected to the game client or after the attendees have had sufficient time to familiarize themselves with the tutorial materials, the instructor may start the training session and the attendees may enter the reception area depicted in FIG. 4G.

FIG. 4D depicts an exemplary tutorial screen 415 for the training session in accordance with an embodiment of the present invention. While the attendees are waiting for others to arrive or login remotely via online sessions or for some amount of time determined by the instructor, attendees may spend some time familiarizing themselves with various features of the game. In this example, an animated character is displayed introducing the attendees to various stages and objects they may encounter in the game environment during the training session.

FIG. 4E depicts various other exemplary tutorial screens 420 in accordance with an embodiment of the present invention. After interacting with the animated character depicted in FIG. 4D and following his instructions, the attendees may be presented with one of more of tutorial screens 420, which explain to the attendee, multiple types of interactions such as but not limited to using the 3D game interface to obtain clues, pick up items, accomplish tasks, unlock rooms in the game, and view a list and current status of problem-solving objectives to be completed.

Figure 4G:
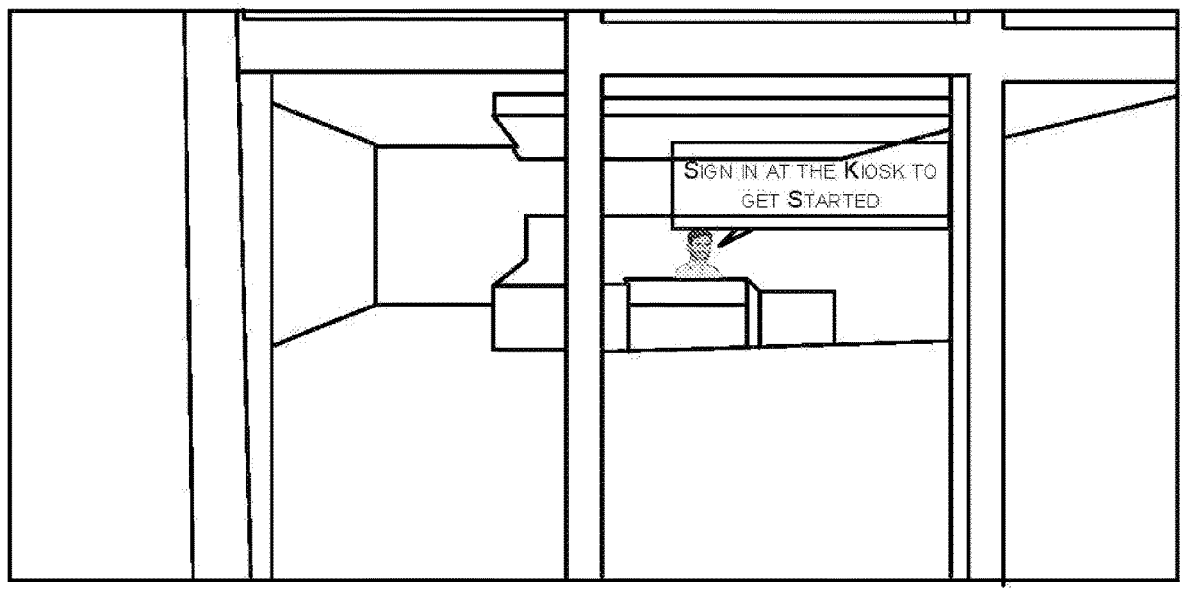
Figure 4H:
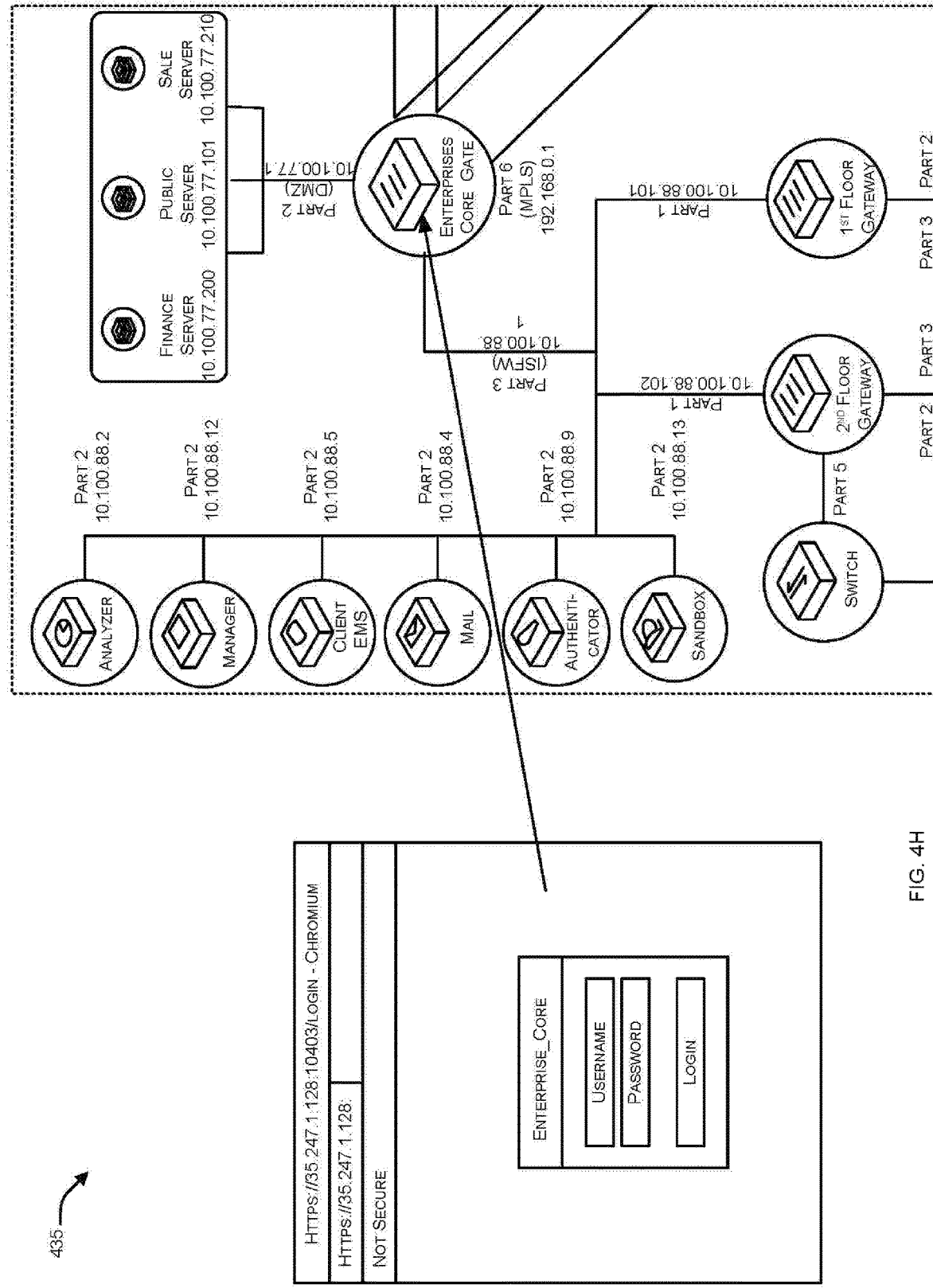
Figure 4I:
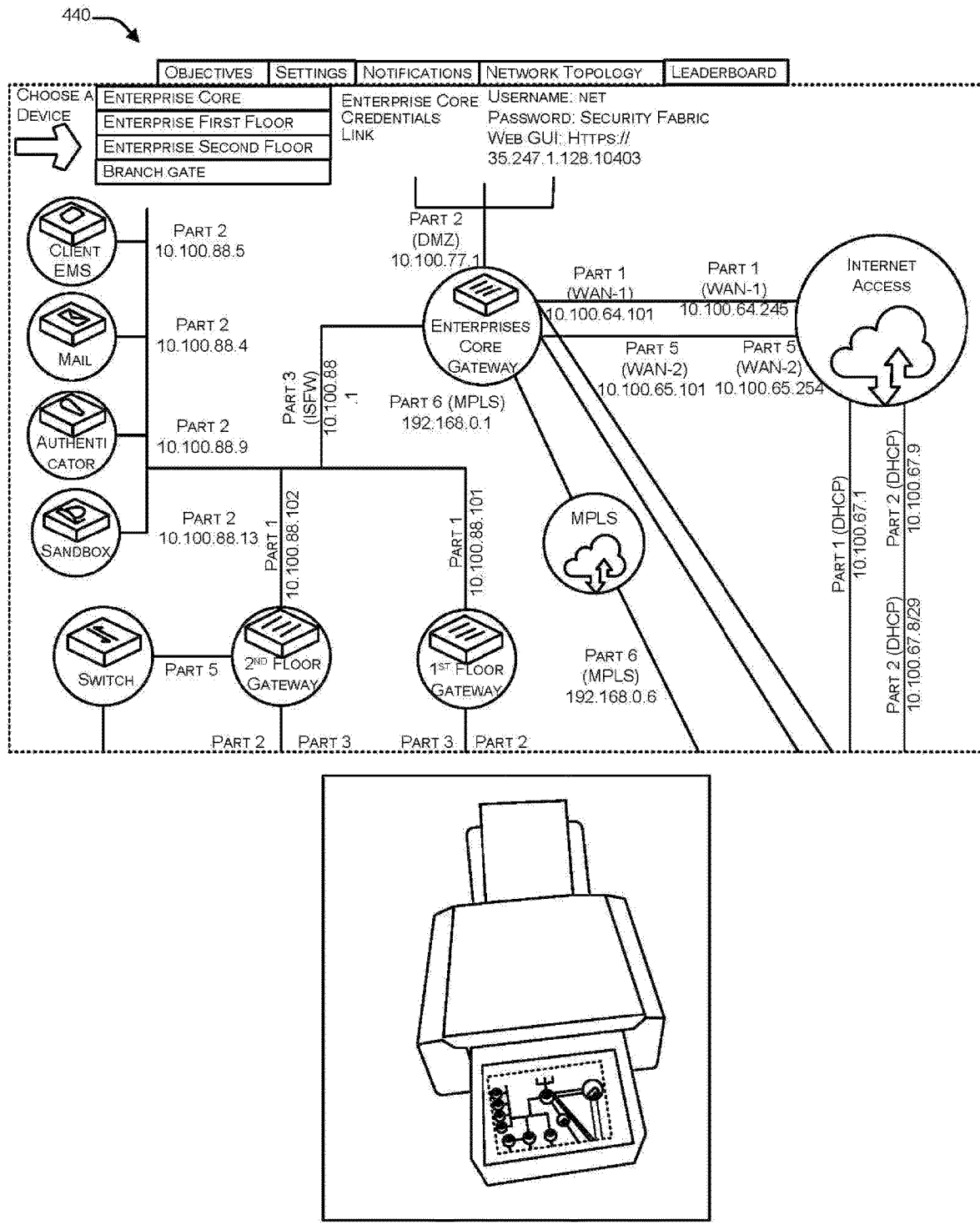
Figure 4J:
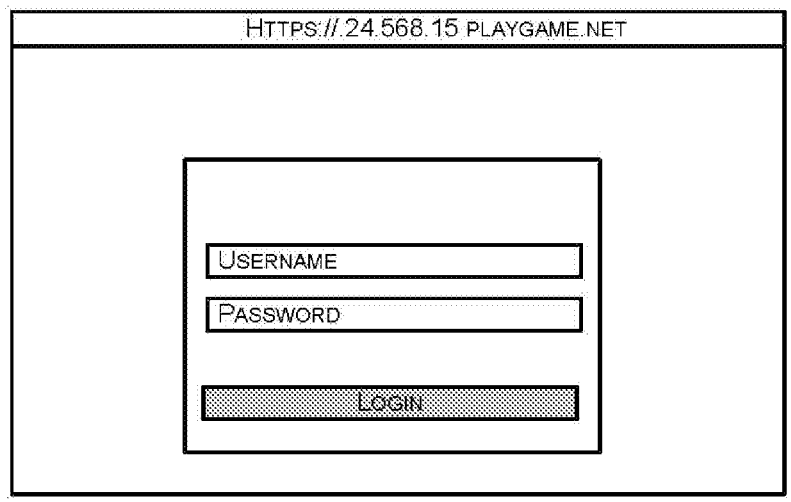
Figure 4J:
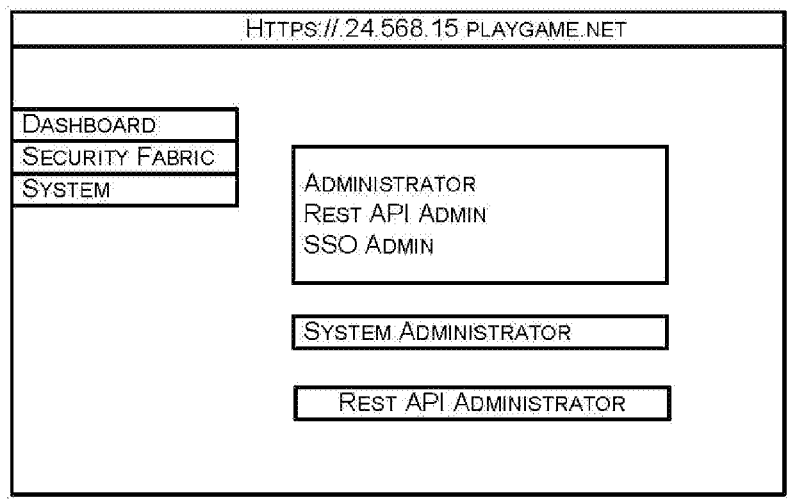
Figure 4K:
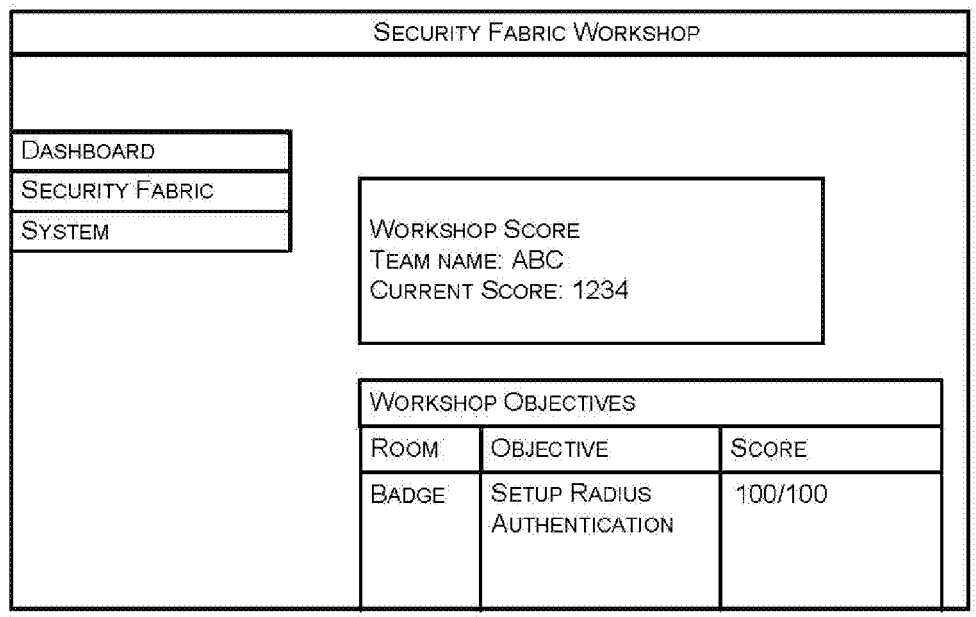

FIG. 4G depicts a screen shot 430 depicting a reception area of the office environment where attendees may begin their training session in accordance with an embodiment of the present invention. After the instructor starts the workshop, the timer is started and the leaderboard notifies the game clients that the session has started. The game clients then transitions to the actual simulated office environment, which in one embodiment, starts at the reception area. In the context of the present example, attendees (players) must pick up on clues in the reception area that encourage them to sign in at the login kiosk. When the attendee clicks on the login kiosk to interact with it, they are taken to a team login page an example of which is illustrated in FIG. 4A.

FIG. 4A depicts a screen shot 400 containing a team login screen for an attendee of a network security training session in accordance with an embodiment of the present invention. The kiosk login screen prompts the attendee to provide information related to their team name, team size, and token. In an exemplary embodiment, a team can be provided with a P-token printed on physical media to ensure that all attendees on the team are assigned the same P-token. Upon entering the information, the attendee can use the login button to transfer the information to the leaderboard. The leaderboard can then assign a virtual environment to the attendee and can send all relevant information to the game client associated with the attendee. In one embodiment, after completing the team login information, the kiosk presents a workshop details page an example of which is illustrated in FIG. 4B.

FIG. 4B depicts a screen shot 405 containing workshop details for an attendee of a network security training session in accordance with an embodiment of the present invention. In the context of the present example, after performing the team login through screen 400 of FIG. 4A, details like server name, team name and a link to the team's virtual environment are displayed. At this point, the attendee may log in with his/her individual credentials and after successful validation of the attendee login credentials and selection of the link to the team's virtual environment a web GUI of virtual environment in the attendees default web browser is presented, outside of the 3D game interface. As such, the attendee has two separate browser windows opened, one updated by the game client and presenting the simulated office environment and another providing through which he/she can access the virtual environment (e.g., environment 108) and information regarding the virtual environment, such as dashboard and status information an example of which is explained with reference to FIG. 4C. As teams log in from within the simulated environment via the kiosk, they will show up on the leaderboard an example of which is described below with reference to FIG. 5B.

FIG. 4C depicts a screen shot 410 of an interface page from which dashboard and status information may be retrieved during game play in accordance with an embodiment of the present invention. In the context of the present example, screen shot 410 allows the attendee to select between dashboard and status information of the training session and includes tabs related to system, licenses, virtual machine and cloud. Details relating to security fabric, the current security rating, and administrators corresponding to the team can be presented. In addition, usage information related to CPU and memory, and training session state can be displayed. In one embodiment, the attendee can access the dashboard and the status anytime during the network security training session.

Figure 4L:
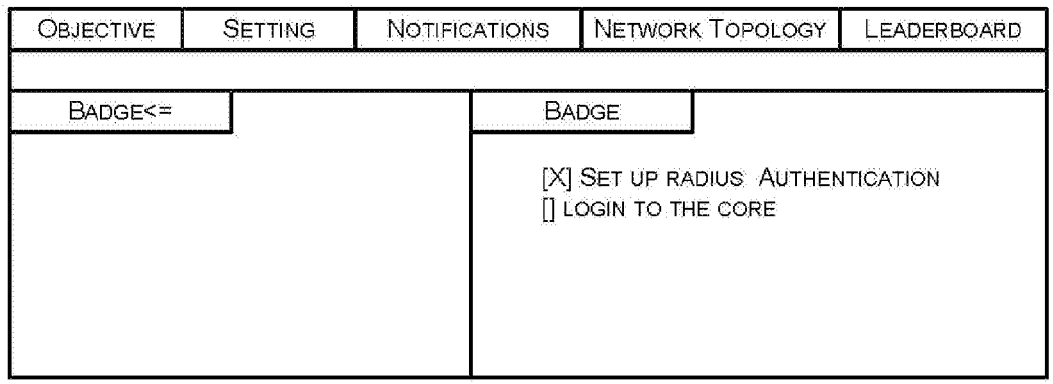

FIG. 4L depicts a screen 455 within the simulated office environment that may be found by attendees interacting with a computer system in the initial room to which they are taken after leaving the reception area. In the context of the present example, interacting with the computer system reveals the first problem-solving objective is to log into the virtual environment (e.g., environment 108) as an unprivileged attendee, and add a RADIUS administrator account. As noted above, in one embodiment, during game play, the interactions by attendees with the virtual network security devices represented within their allocated virtual environments is through respective actual web GUIs or CLIs of the underlying full-feature virtual network security appliances. As such, without the RADIUS administrator account, the attendees would otherwise be unable to configure other features within the virtual environment.

FIG. 4H depicts a screen 435 through which the attendee may login to the core gateway of the enterprise in accordance with an embodiment of the present invention. In the context of the present example, in order to complete the first problem-solving objective, the attendee uses the web browser window depicting the virtual environment to log into the core virtual network security device with provided unprivileged credentials. At this point, the attendees can then proceed to create a RADIUS administrator (via the GUI (not shown) or the CLI (not shown) of the core virtual network security device).

FIG. 4I depicts a screen 440 including as set of tabs including, objectives, settings, notifications, network technology and leaderboard. Through the network topology tab, the attendee can view the network topology of the simulated deployed network environment, (virtually) print it and "pick up" and place it into their inventory for future reference as they solve one or more subsequent problem-solving objectives. The attendee can also view the current objective the attendee is expected to accomplish via the objectives tab. In one embodiment, the virtual network security devices represented within the virtual environment (e.g., environment 108) are those for which the attendees are to receive training.

Continuing with the current example, in which the attendee has created the RADIUS administrator, the attendee can now log in with provided credentials to gain elevated administrative privileges. This login process can be via the exemplary login screen 445 depicted in FIG. 4J. Once logged in with the elevated administrative privileges, the attendee may be able to select from multiple administrative roles (e.g., Administrator, REST API Admin, SSO Admin) via a security fabric tab shown on the bottom screen of FIG. 4J.

FIG. 4K depicts a screen 450 shows an example of an attendee's dashboard, identifying the team name, workshop score, open workshop objectives, completed workshop objectives and scores for completed workshop objectives in accordance with an embodiment of the present invention. In the context of the present example, because the attendee has correctly and accurately completed the first problem-solving objective, e.g., creating a RADIUS administrator, the attendee has a current score of 100 out of a possible 100 points.

Figure 4M:
Figure 4M:
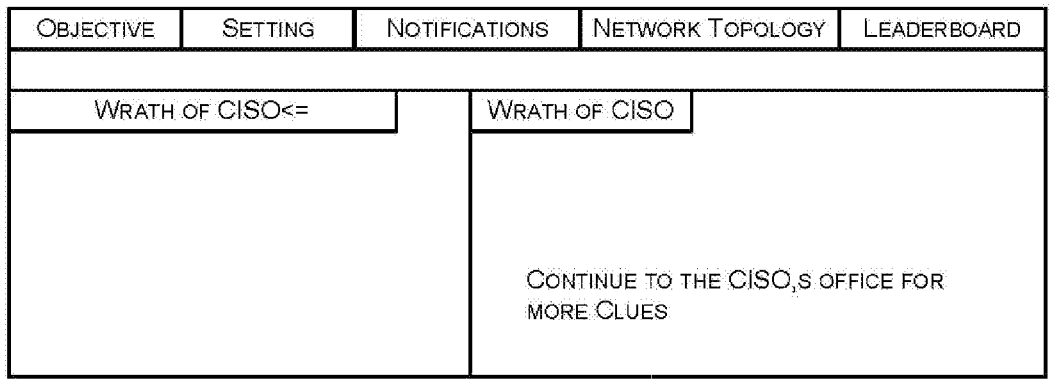
Figure 4N:
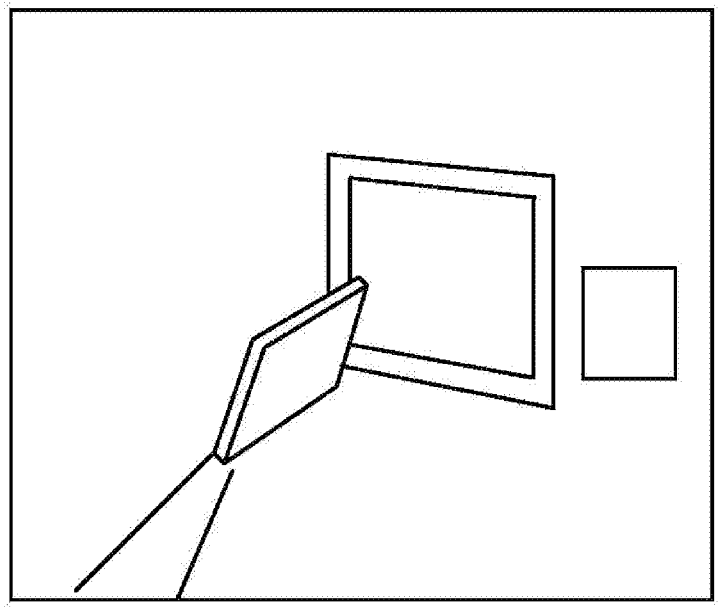
Figure 4N:
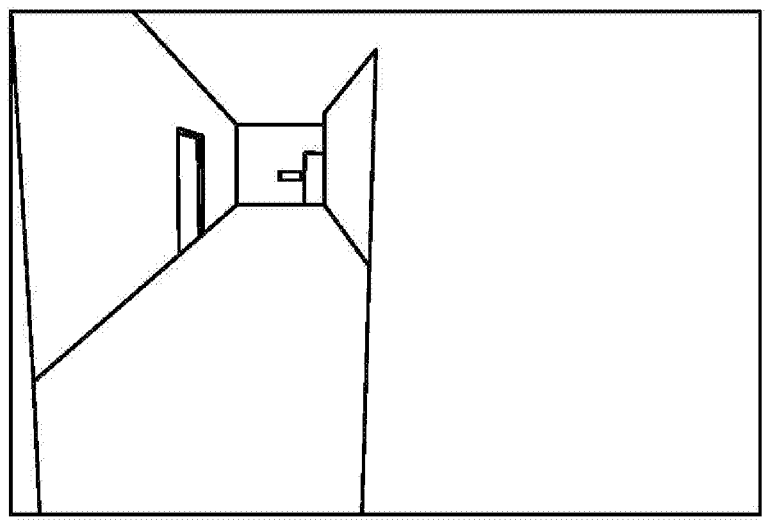

FIG. 4M depicts a screen 460 that may be displayed to an attendee upon completion of the first set of problem-solving objectives in accordance with an embodiment of the present invention. In the context of the present example, screen 460 indicates the "badge" objective group has been completed by team ABC and that the next stage or set of problem-solving objectives is referred to as "Wrath of CISO." Furthermore, the attendee is directed to continue to the CISO's office for more clues regarding their next set of problem-solving objectives.

As noted above, in one embodiment, the game training may follow an escape room type theme. Now, that the first set of problem-solving objectives has been completed, the attendee is capable of leaving the current room/office/location and the game client may provide direction to the attendee regarding obtaining clues for the next set of problem-solving objectives. In the context of the present example, a second room (e.g., the CISO's office) contains clues regarding another set of problem-solving objectives for the attendee to complete.

FIG. 4N depicts two screen shots 465 within the simulated office environment in accordance with an embodiment of the present invention. In the context of the present example, the attendee has completed the first set of problem-solving objectives and can now place an access card in proximity to a keycard reader to unlock an electrically-powered door and enter into a hallway through which the attendee can to navigate to next room.

FIG. 5A illustrates exemplary screen shot 500 of a user interface relating to a scoreboard in accordance with an embodiment of the present invention. In the context of the present example, a scoreboard (which can also be integrated in a leaderboard) can maintain progress of attendees of the virtual conference that are attempting to access their various learning objectives of associated network security products via virtual booths. The scoreboard can display attendee's name, badge, rank, completion status of learning objectives, security rating and the like. The attendee's rank and security rating can be based on attendee's metrics relating to completion of learning objectives as well as problem-solving objectives, which can be used to track the progress and suggest regarding other learning objectives, in which they might be potentially interested.

FIG. 5B illustrates exemplary screen shot 510 of a user interface relating to a leader board in accordance with an embodiment of the present invention. In the context of the present example, the leaderboard includes details of teams that are attempting to complete their respective problem-solving objectives. Leaderboard can display team's name, badge, rank and details like duration for which attendee is participating in the virtual environment. The team's rank can be based on attendee's metrics relating to completion of problem-solving objectives. For example, rank may be calculated based on metrics with parameters like degree of accuracy to complete the problem-solving objective and amount of time required to complete problem-solving objective. The leaderboard can also show incident data associated with the team. Incident data shows an occurrence of a problem-solving event by attendee. A current security rating score achieved by the attendee based on the current security posture of their virtual environment may also be is displayed on the leaderboard. The score can be displayed in either a numerical and/or in a graphical form. Depending upon the particular implementation, the security rating may be indicative of a level of vulnerability and/or configuration weakness, for example, of the attendee's current security settings of the network security devices within the virtual environment. The current security rating and total objective score of a team of attendees can be displayed on the leaderboard.

In an embodiment, the leaderboard screen can be projected in the physical room in which the training is taking place, for every attendee to observe the current security rating scores of other participating attendees of other teams of attendees. This helps determine a quick comparative performance of the other attendees so that the attendees are more engaged and are motivated to participate and stay on track to complete problem-solving objectives before other teams of attendees.

FIG. 6A illustrates a new administrator screen 600 that may be used by an attendee of a network security training session in accordance with an embodiment of the present invention. In the context of the present example, screen shot 600 shows a form for creating a new administrator account for a virtual network security device within the virtual environment (e.g., environment 108). Information required for the new administrator form includes—username, type, password, confirm password, comments, administrator profile and email address. An access to administrator profile can be done via SMS, two-factor authentication or by restricting the log-in to administrator profile by trusted hosts.

Figure 6B:
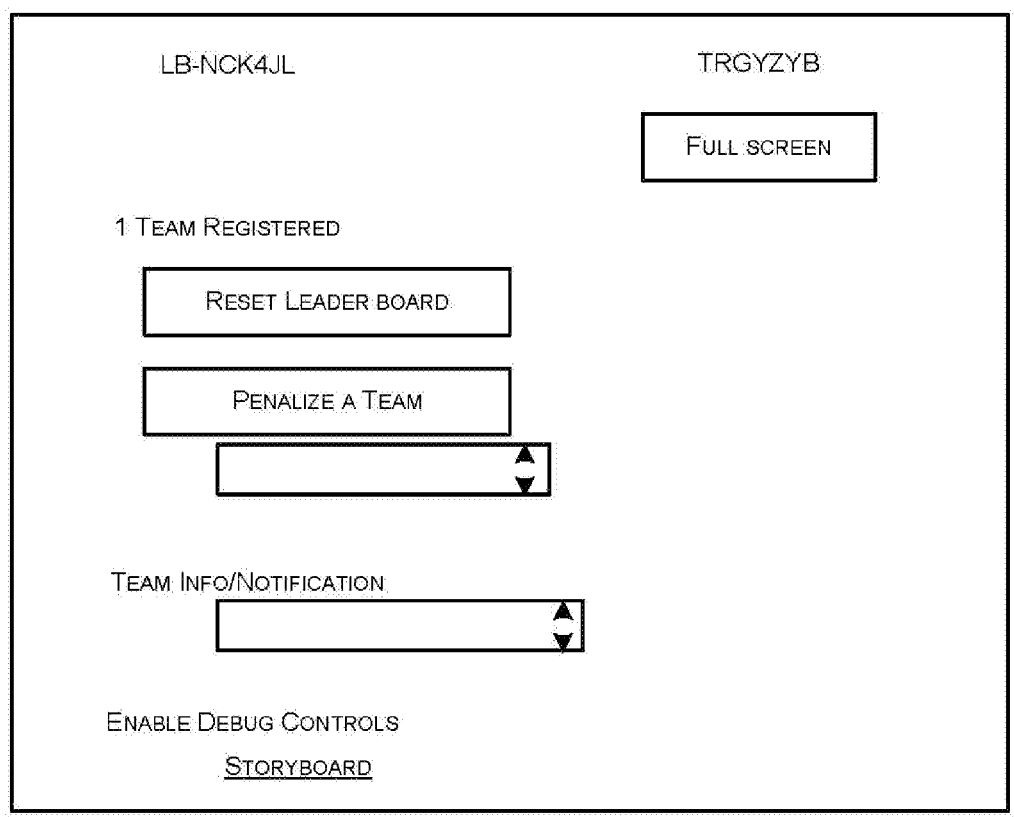

FIG. 6B illustrates a screen 620 that may be used by an administrator of a network security training session in accordance with an embodiment of the present invention. In the context of the present example, screen 620 represents an exemplary interface through which the administrator can view the number of registered teams and manage various aspects of the training session, including resetting the leaderboard, penalizing a team, sending a notification to a team and/or editing the storyboard.

FIG. 6C illustrates a storyboard screen 640 that may be used by an administrator of a network security training session in accordance with an embodiment of the present invention. In context of the present example, storyboard screen 640 presents the current content of an exemplary storyboard of a game. The storyboard provides an overview of the workshop flow. An interface can be displayed on an administrator device to allow the administrator to view and/or update the storyboard. The storyboard may include details regarding various aspects of the training session/problem-solving objectives. For example, the storyboard includes details like the duration of the training session, the maximum audit score, bonuses, answer penalties, team information and the objectives. Problem-solving objectives, teams, game state triggers and the like can be edited by administrator within the storyboard. For example, the administrator may select from multiple pre-configured objectives (e.g., go to reception, wrath of CISO, board meeting) and assign point values to the selected objectives. In addition, the administrator may also be provided with the ability to edit the storyboard in real-time as the game is being played by providing changed text for clues, objective text, text bubbles associated with characters in the game and/or scripted triggers, for example. Notes for training session/problem solving objectives can also be presented on storyboard to facilitate the instructor's ability to provide guidance and direction to workshop/training session attendees.

Figure 6D:
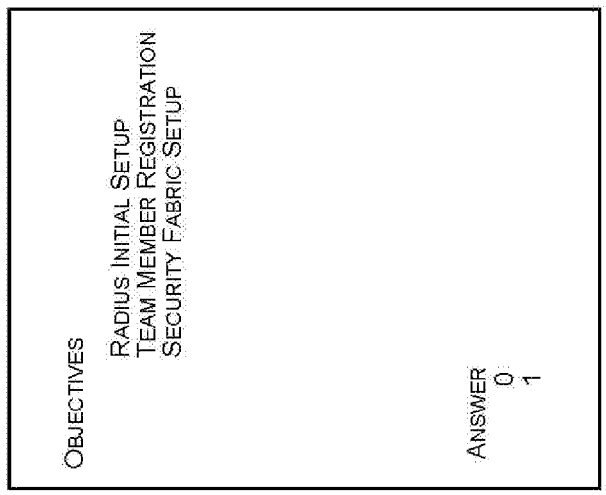
Figure 6D:
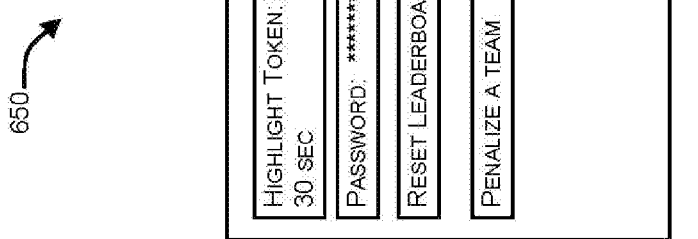
Figure 7B:
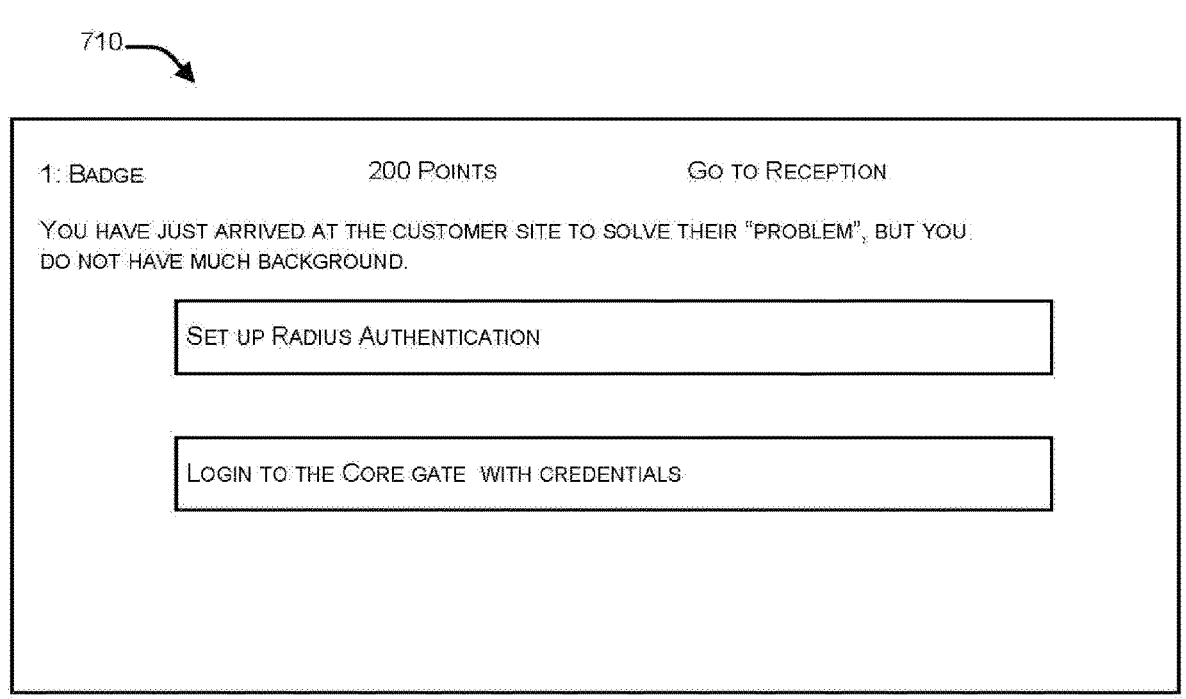
Figure 7D:
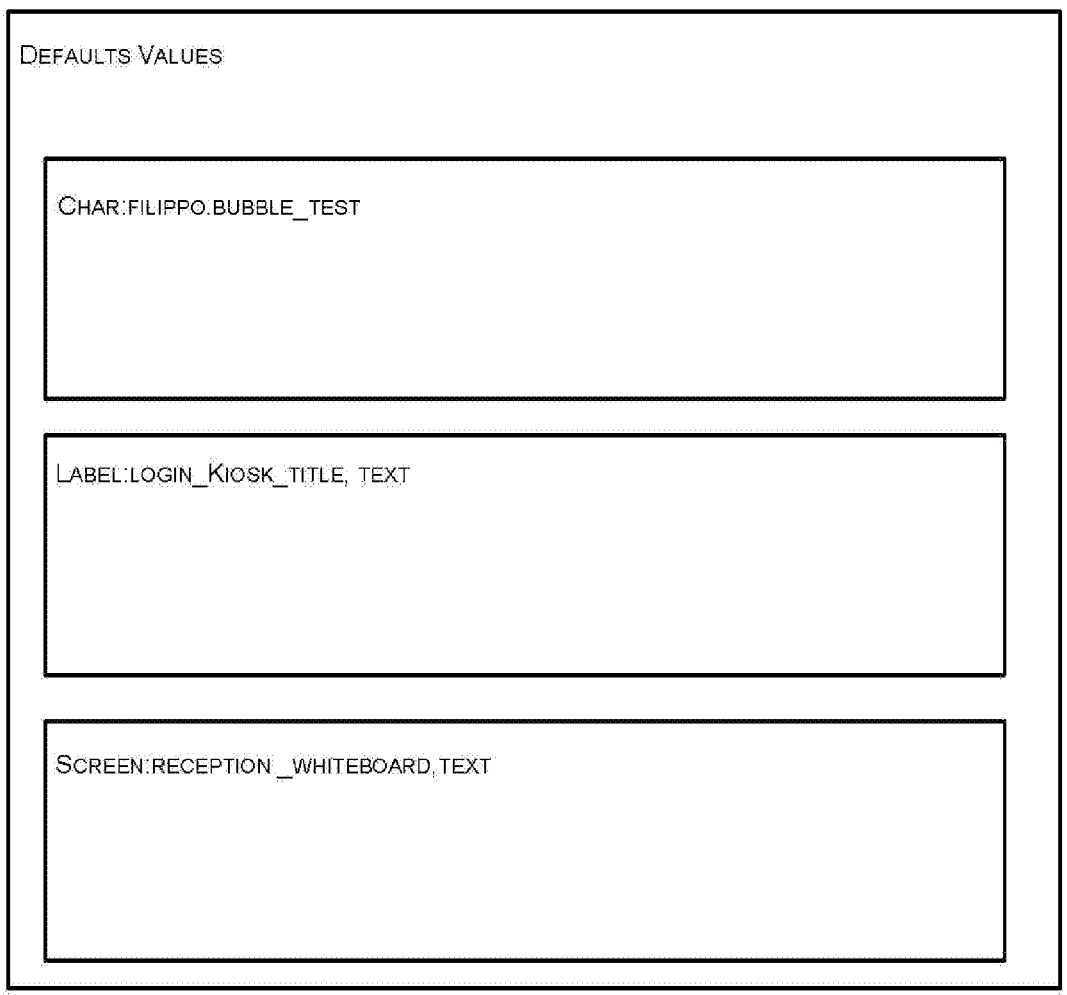
Figure 7E:
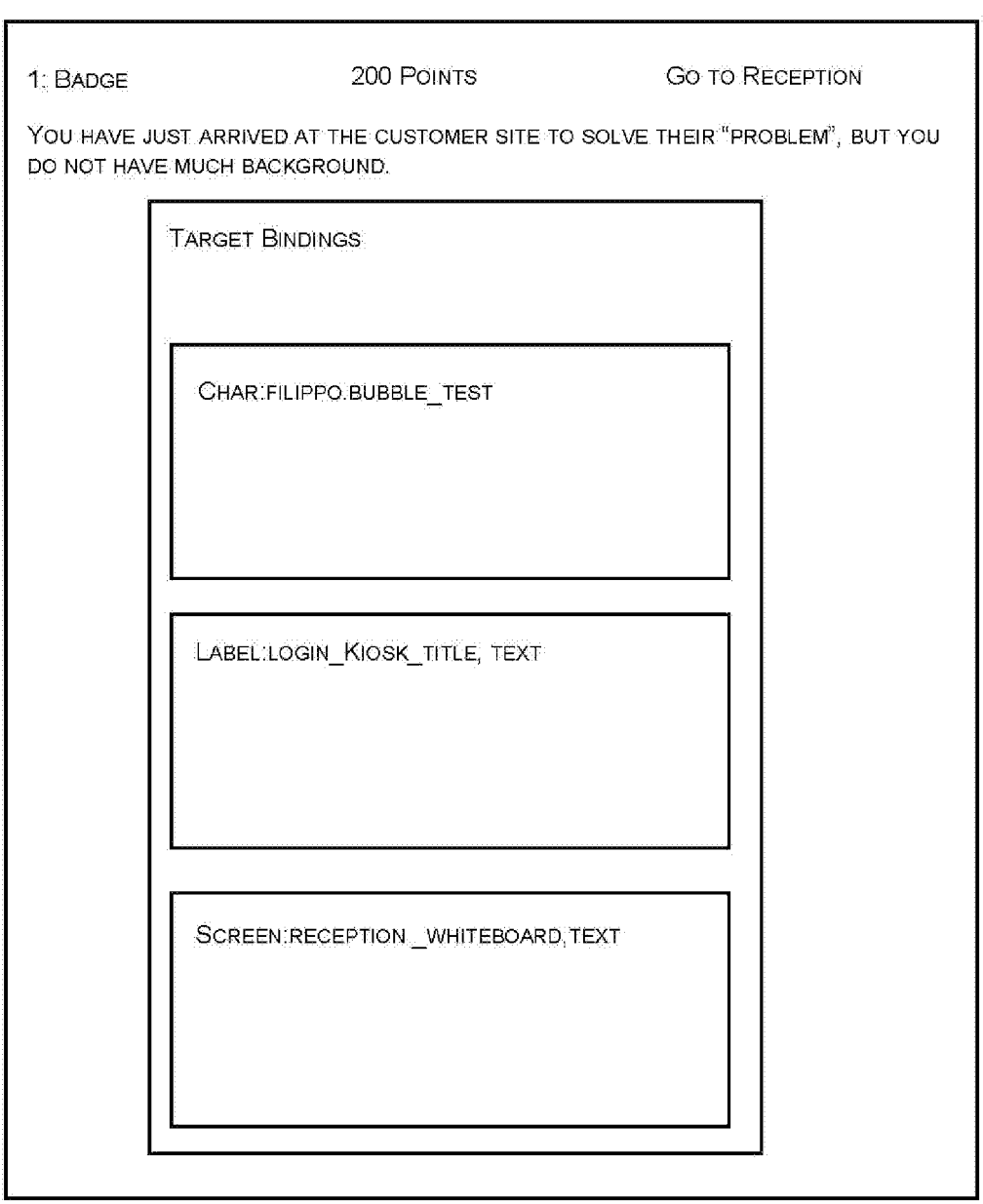

FIG. 6D illustrates various other screens 650 that may be presented to an administrator of a network security training session in accordance with an embodiment of the present invention. In the context of the present example, screens 650 represent additional examples of the game training administrative interface, which includes powerful options related to team administration, client device information, the ability to override, change and/or reorder objectives and the like.

FIGS. 7A-E represent various modes for managing a network security training session through an administrator device in accordance with an embodiment of the present invention.

In the context of the present example, representation 700 shows various blocks for authoring objectives for the workshop. A web-based editor can accelerate workshop authoring. Administrator and/or as a domain expert can author a workshop and test results live in a simulated environment. Objectives in the workshop can be dragged and dropped to reorder. In addition, elements like groups, objectives, scripting elements can be added or removed.

In the context of the present example, representation 710 shows means to organize objectives. Extra context labels can be added by hovering over a list of objectives. Any text in objectives can be clicked for editing and setting correct objective ID. Also, a 'bbcode' script can be used for rich text formatting.

In the context of the present example, representation 720 may include spoiler information. Spoiler information may include instructor notes and CLI and solution details for a particular problem-solving objective. Instructor notes are intended to help the instructor provide guidance to the attendees. CLI details can provide information regarding the specific CLI commands required to accomplish the particular configuration required by the objective. Solution details can be provided, for example, in the form of a step-by-step GUI walkthrough.

In the context of the present example, representation 730 shows scripting of simulations. As shown, target bindings connect leaderboard state to simulated environment, set values for simulated props, present clue text, speech bubble text, and prop location/visibility. Using screen shot 730, for example, the instructor can edit what a character named "Filippo" will say to attendees via his text bubble. Various other text presented to attendees at different times throughout the game via characters and/or objects can also be edited.

In context of the present example, representation 740 shows workshop reaction to change in objectives. Objective group completion can trigger new values for props. As an example, setting access_granted set on reception area door lock, allows attendee to move to the next area, changing a speech bubble of a character encourages attendees to move on. Bindings are processed in group order, with default binding being processed first, and values from later group overriding earlier set values set.

Figure 8:
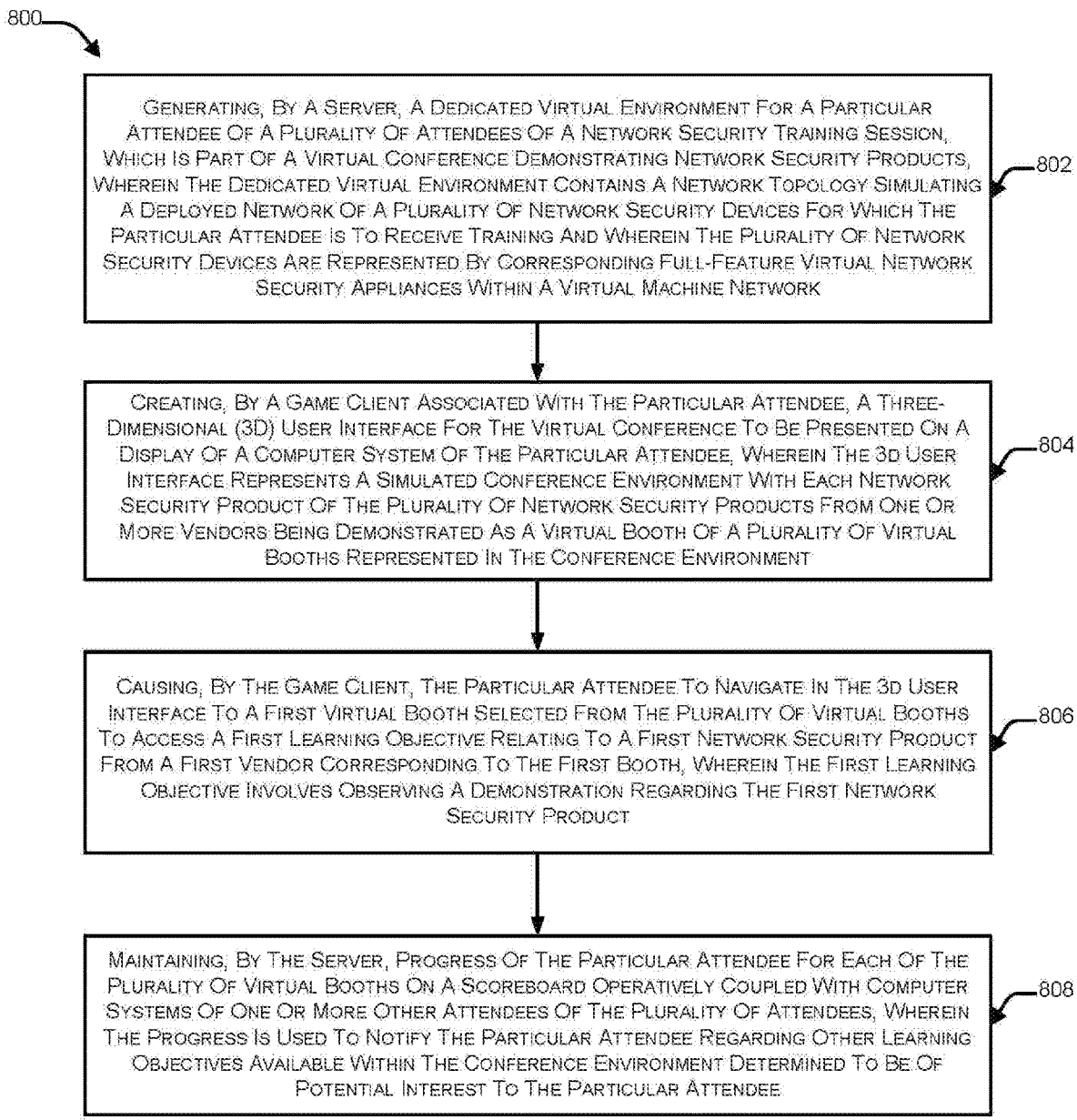
FIG. 8 is a simplified flow diagram illustrating interactions between one attendee and the user interface in the context of a virtual conference in accordance with an embodiment of the present invention.

FIG. 8 is a simplified flow diagram illustrating interactions between one attendee and the user interface in the context of a virtual conference in accordance with an embodiment of the present invention. While those skilled in the art will appreciate the architectures described herein (e.g., architecture 100, 120 and 140) are capable of supporting multiple attendees of a virtual conference, for purposes of simplicity, the present example is described with reference to interactions between a single attendee and the user interface.

In the context of the present example, at block 802, a server generates a dedicated virtual environment for a particular attendee of a network security training session, which is part of a virtual conference that demonstrates network security products. The dedicated virtual environment contains a network topology simulating a deployed network of network security devices for which the particular attendee is to receive training and the network security devices are represented by corresponding full-feature virtual network security appliances within a virtual machine network.

In an aspect, a game client associated with the particular attendee, at block 804, creates a 3D user interface for the virtual conference to be presented on a display of a computer system of the particular attendee. The 3D user interface represents a simulated conference environment with each network security product of the network security products from one or more vendors being demonstrated as a virtual booth of various virtual booths represented in the conference environment.

In an aspect, the game client, at block 806, causes the particular attendee to navigate in the 3D user interface to a first virtual booth selected from the virtual booths to access a first learning objective relating to a first network security product from a first vendor corresponding to the first booth. The first learning objective involves observing a demonstration regarding the first network security product.

In an aspect, the server, at block 808, maintains progress of the particular attendee for each of the virtual booths on a scoreboard operatively coupled with computer systems of one or more other attendees. The progress is used to notify the particular attendee regarding other learning objectives available within the conference environment determined to be of potential interest to the particular attendee.

Figure 9:
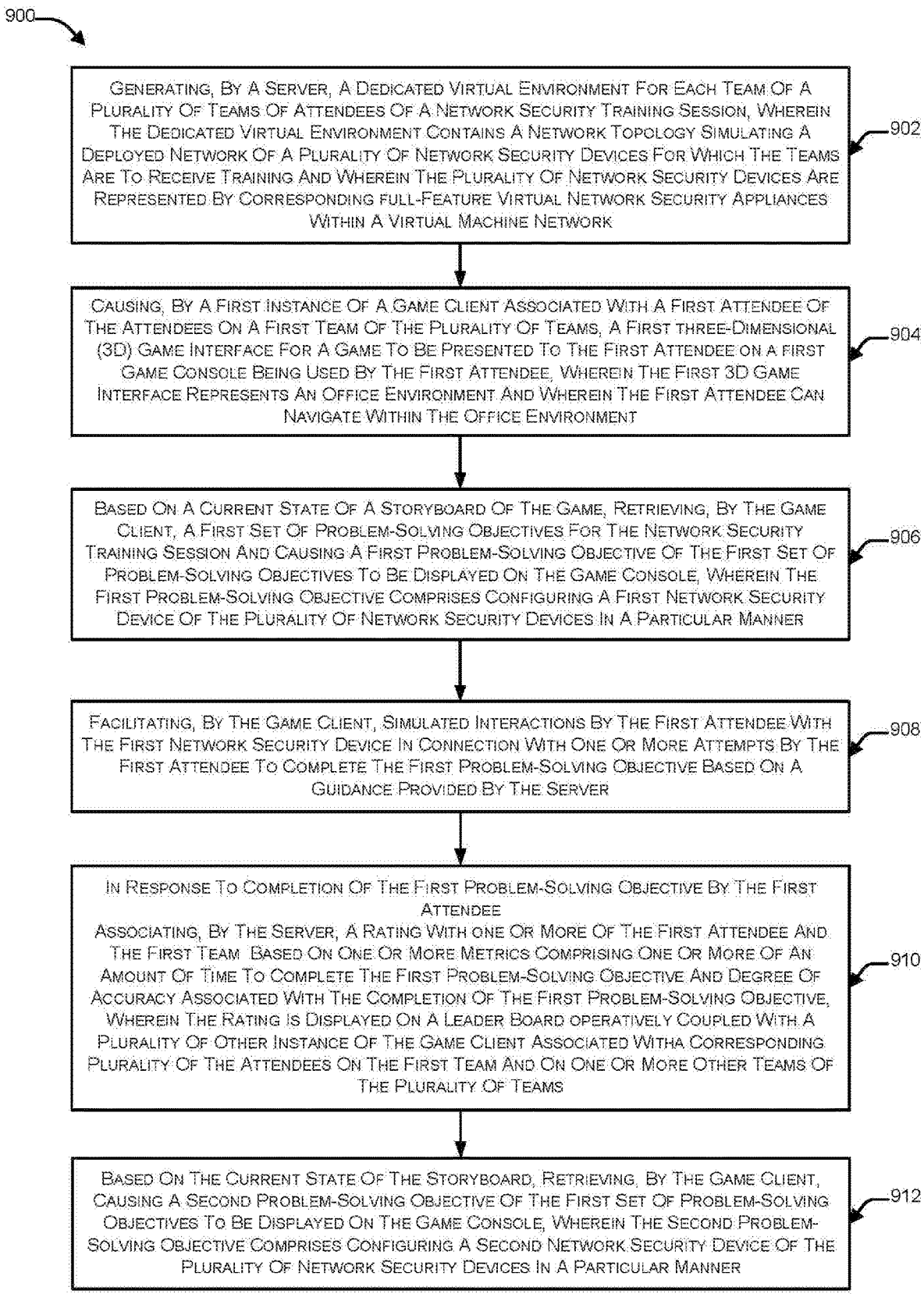
FIG. 9 is a simplified flow diagram illustrating interactions between one attendee and the game client in the context of a network security training session in accordance with an embodiment of the present invention.

FIG. 9 is a simplified flow 900 diagram illustrating interactions between one attendee and the game client in the context of a network security training session in accordance with an embodiment of the present invention. While those skilled in the art will appreciate the architectures described herein (e.g., architecture 100, 120 and 140) are capable of supporting multiple concurrent training sessions each having a number of online and onsite attendees, for purposes of simplicity, the present example is described with reference to interactions between a single attendee and the training game.

In the context of the present example, a network security training session is provided for training session attendees via an interactive gaming style interface and dedicated virtual environments containing a simulated deployed network of security products. The types of network security products and the type and complexity of the network topology may be selected and configured based on the training for which the attendees are to receive and the skill level of the attendees. At block 902, a dedicated virtual environment is generated by a server (e.g., server 104) for each team of attendees of a network security training session in a similar manner as explained above in connection with block 802.

In an aspect, a first instance of a game client that is associated with an attendee on a team causes, at block 904, a three-dimensional (3D) game interface for a game to be presented on a display of a computer system that is being used by attendee. In one embodiment, the 3D game interface represents a simulated office environment and the attendee can navigate within the environment.

In an aspect, at block 906, the game client retrieves a problem-solving objective relating to the network security training session and presents the problem-solving objective on a display of a computer system of the attendee. In one embodiment, the problem-solving objective is retrieved from the leaderboard server 112 based on the leaderboard server's game state, which may be fully administrator (instructor) configurable via the storyboard and/or other administrator interactions with the leaderboard server 112. Such configurability allows, among other things, the administrator to tailor the training game experience on-the-fly to the level of skill of the attendees. In one embodiment, the problem-solving objective may be configuring a network security device in a particular manner. Non-limiting examples of other problem-solving tasks include:

Testing connectivity to the network.
Configuring interfaces of the virtual network security device.
Security Fabric setup.
EMS setup.
Network security management device (e.g., a FORTI-MANGER management appliance available from the assignee of the present invention) setup.
Configuring one or more firewall policies of the virtual network security device.
Configuring logging performed by one or more of the virtual network security devices.
Setting up email notifications upon detection of a defined event.
Configuring spam filtering and/or antivirus processing performed by the message security appliance (e.g., an email security appliance, such as the FORTIMAIL message security appliance available from the assignee of the present invention.)
Configuring endpoint security software (e.g., the FORTI-CLIENT integrated endpoint protection platform available from the assignee of the present invention) via an endpoint management system (e.g., the FORTICLIENT EMS available from the assignee of the present invention).
Configuring sandbox appliance settings.
Addressing various types of incidents (e.g., detection of a malware download, detection of a data leak, an intrusion prevention system alert, detection of a potentially compromised endpoint and the like).

In an aspect, at block 908, the game client facilitates interactions by attendee with the network security device at issue related to attempts made by the attendee to complete the problem-solving objectives. As noted above, during game play, guidance and clues may be provided by the game client via characters and/or objects within the simulated office environment.

In response to completion of the problem-solving objective by attendee, at block 910, the virtual environment (e.g., environment 108) associates a rating with attendee and team based on, for example, one or more metrics comprising an amount of time required to complete the problem-solving objective and degree of accuracy associated with completion of the problem-solving objective. In one embodiment, the rating is calculated by one or more of the network security devices (e.g., network security device 144-1, 144-2, 144-3) within the virtual environment. For example, a core network gateway device that is configured to perform security rating processing may gather and analyze configurations from one or more other of the network security devices within the virtual environment and calculate a current security rating based thereon as described above. The security rating thus calculated can be communicated to the leaderboard in the form of a security rating report. Independently or concurrently with the calculation of the current security rating, generation of a objective completion report can be triggered responsive to one or more predetermined or configurable events. For example, the objective completion report may be communicated to the leaderboard in response to detection of configuration changes to one or more virtual network security devices within the virtual environment or in response to a request for the current workshop score by an attendee or by the instructor. Alternatively or additionally, the objective completion report or some subset of the information contained therein may be automatically communicated to the leaderboard at a predetermined or configurable interval. In any event, one or both of the security rating report and the objective completion report may be used by the leaderboard to cause one or more scores to be displayed on the leaderboard that is operatively coupled with multiple other instance of game client that is associated with a corresponding multiple attendees on a team and on multiple other teams. This workshop scoring information may also be available via a workshop score page (not shown) (e.g., a special page available only in workshop versions of the network security device operating system) accessible via a workshop score button, which may also trigger the objective completion report to be sent to the leaderboard.

In an aspect, at block 912, based on the current state of the training game, the game client retrieves and presents another problem-solving objective from the set of problem-solving objectives on the display of the computer system. When all objectives of the first set of problem-solving objectives are completed, the game client may retrieve a next game state from the storyboard maintained by the leaderboard and present a first objective from of a second set of problem-solving objectives. In addition to the next set of problem-solving objectives, the next game state may also specify which doors are locked/unlocked, contents and locations of clues, text in each character's speech bubble and more.

Figure 10:
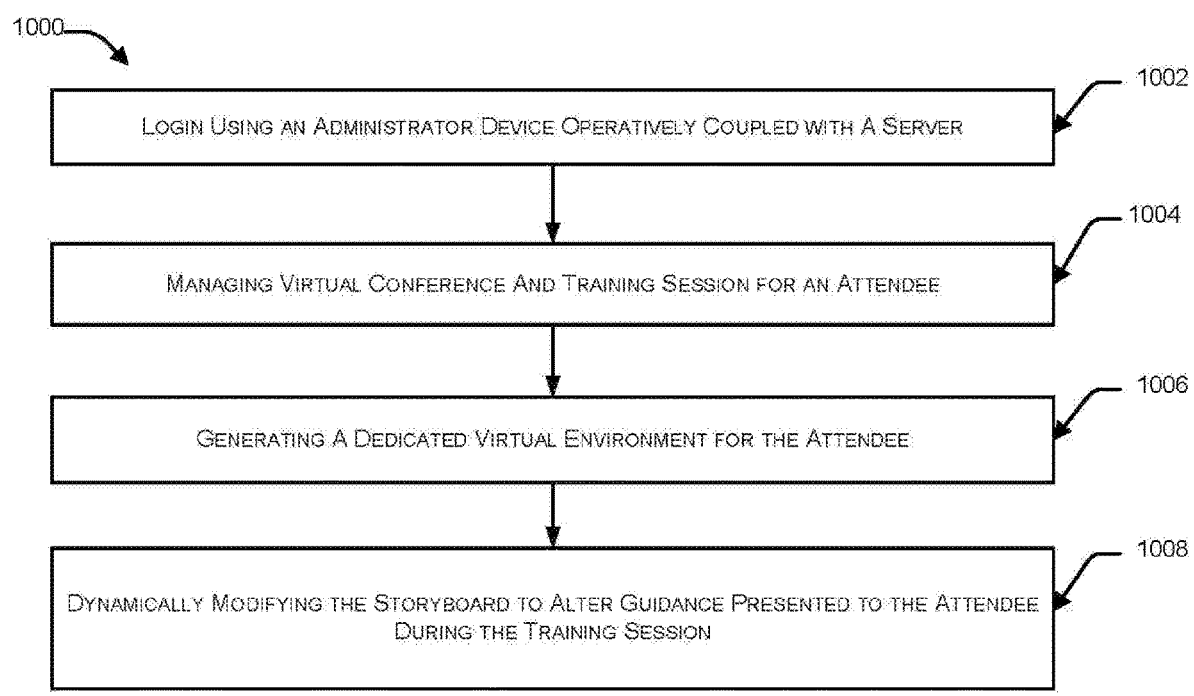
FIG. 10 is a flow diagram illustrating exemplary high-level initialization and running of a training session in accordance with an embodiment of the present invention.

FIG. 10 is a flow diagram 1000 illustrating exemplary high-level initialization and running of a training session in accordance with an embodiment of the present invention. At block 1002, an administrator can login using an administrator device by providing administrator login details. Further, at block 1004, the administrator can manage training session (included in the virtual conference) of an attendee by initializing information such as the training duration, the maximum audit score, bonuses, answer penalties, team information and the objectives. Furthermore, at block 1006, a server (e.g., server 104) can generate a dedicated virtual environment for the attendee such that the dedicated virtual environment contains a network topology simulating a deployed network of one or more network security devices for which the attendee will be provided training. In one embodiment, one of the problem-solving objectives may call for the attendee to configure a first network security device in a particular manner. At block 1008, the administrator can dynamically modify the storyboard to alter, among other things, the amount and type of guidance to be provided to the attendee, the number and type of clues, the number, type and complexity of objectives. For example, the number and complexity of problem-solving objectives can be tailored to match the skill level of the attendee.

Figure 11A:
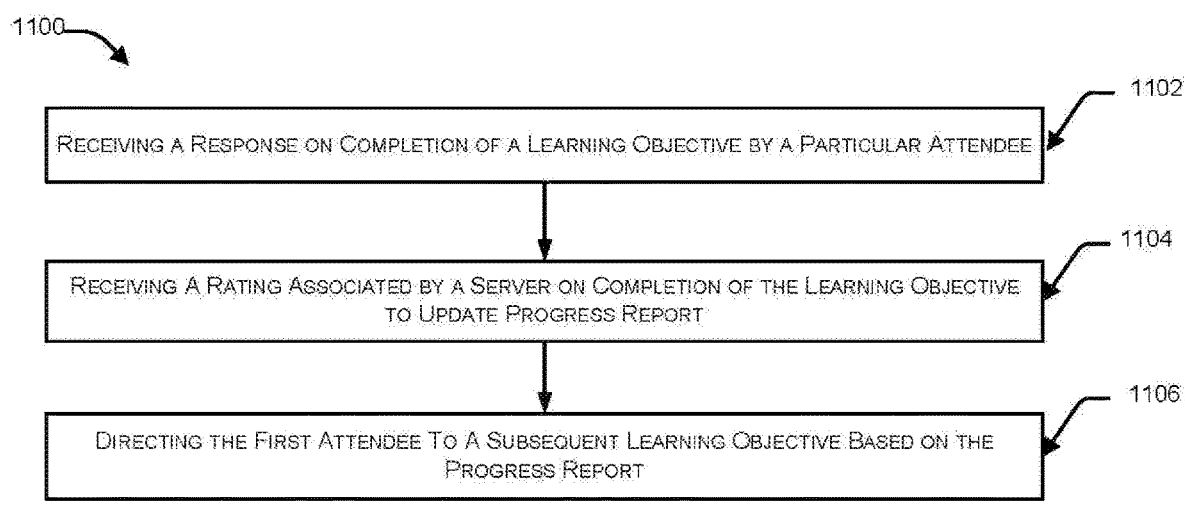
FIG. 11A is a flow diagram illustrating a scoreboard update process in accordance with an embodiment of the present invention.

FIG. 11A is a flow diagram illustrating a scoreboard update process in accordance with an embodiment of the present invention. At block 1102, the scoreboard receives information regarding the completion of a learning objective by a particular attendee. As noted above, objective completion reports and/or security rating reports may be received periodically or in response to predefined or configurable events by the leaderboard (which may include the scoreboard). At block 1104, the scoreboard receives a rating calculated by a server based on learning-objective completion report. As noted above, the scoreboard can calculate an objective score to update the progress report based on the completed learning as well as problem-solving objectives and their respective point values. At block 1106, the scoreboard may direct the attendee to a subsequent learning objective or a training session based on the updated progress report.

Figure 11B:
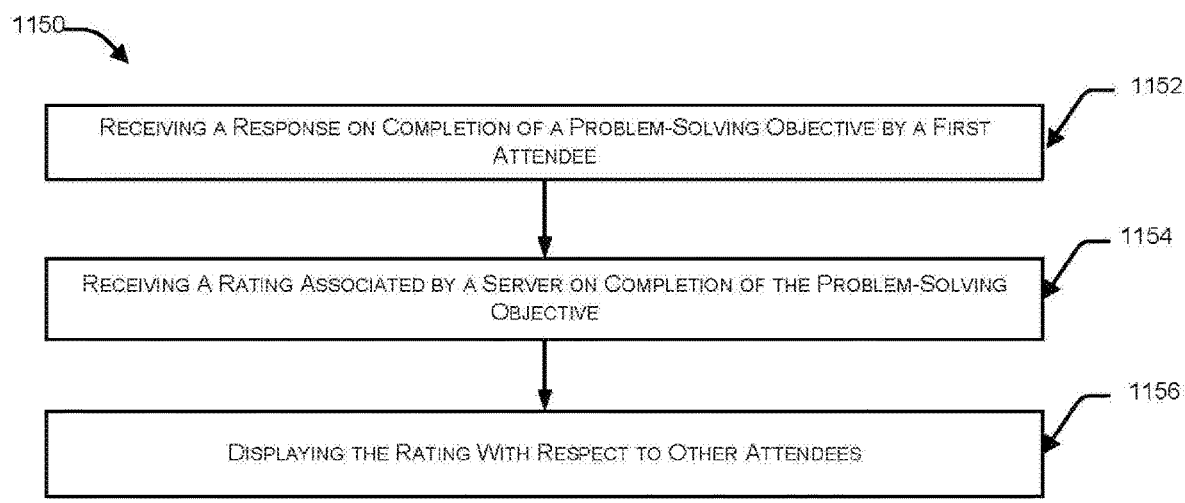
FIG. 11B is a flow diagram illustrating a leaderboard update process in accordance with an embodiment of the present invention.

FIG. 11B is a flow diagram illustrating a leaderboard update process in accordance with an embodiment of the present invention. At block 1152, the leaderboard receives information regarding the completion of a problem-solving objective by a first attendee. As noted above, objective completion reports and/or security rating reports may be received periodically or in response to predefined or configurable events by the leaderboard. At block 1154, the leaderboard receives a security rating calculated by a network security device of the dedicated virtual environment at issue and/or an objective completion report. As noted above, the leaderboard can calculate an objective score based on the completed objectives and their respective point values. In one embodiment, the objective score can be further modified by bonus values based on one or more metrics, for example, including an amount of time required to complete the problem-solving objective and degree of accuracy associated with completion of the problem-solving objective. At block 1156, one or more scores (e.g., the raw security rating, the objective score and/or a score based on a combination thereof) with respect to scores/ratings of other attendees is displayed on the leaderboard as the leaderboard is operatively coupled with multiple other instance of game client that is associated with a corresponding plurality of multiple attendees.

Figure 12:
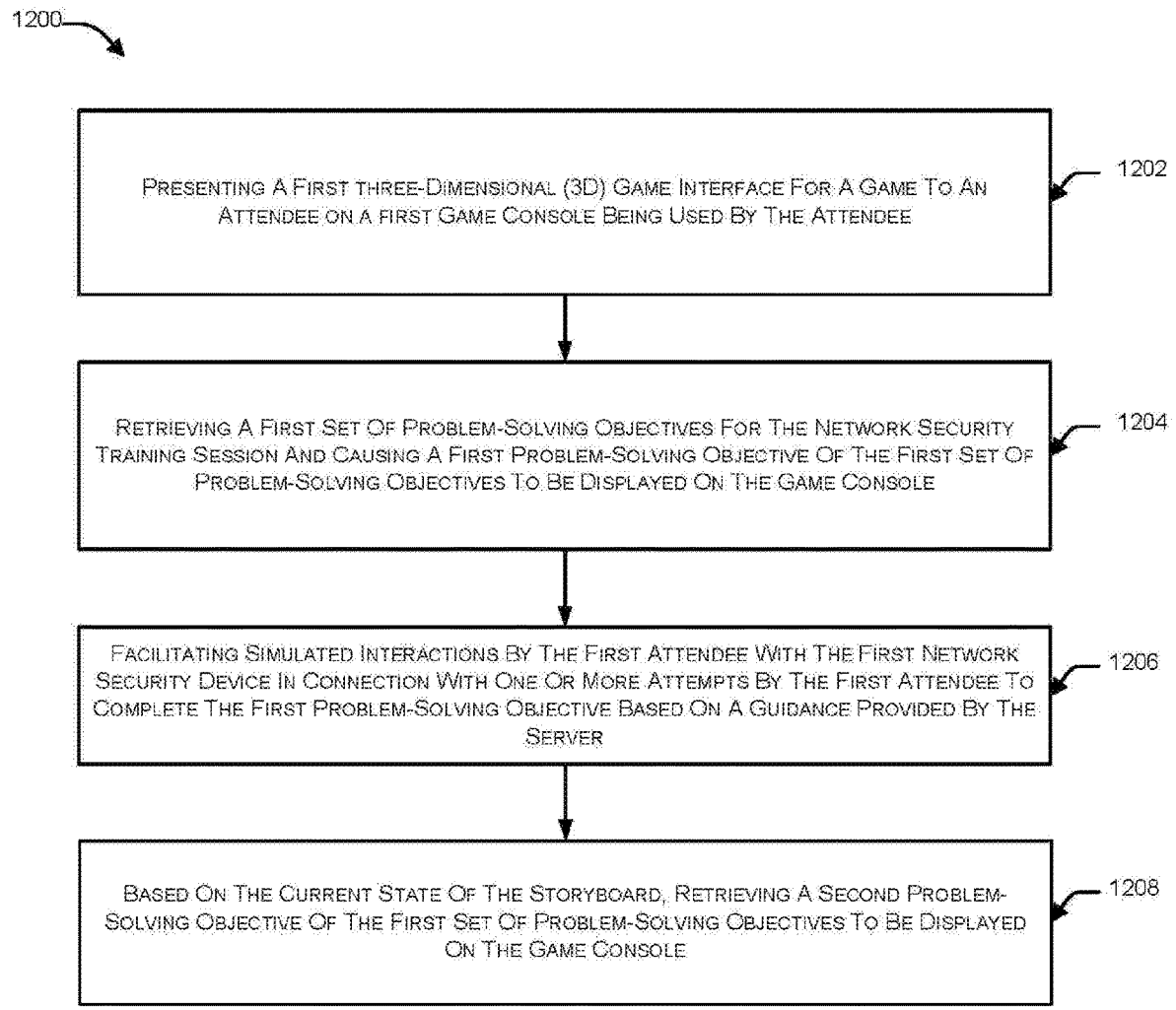
FIG. 12 is a flow diagram illustrating game client processing in accordance with an embodiment of the present invention.

FIG. 12 is a flow diagram illustrating game client processing in accordance with an embodiment of the present invention. In an aspect, a first instance of a game client that is associated with an attendee, at block 1202, presents a three-dimensional (3D) game interface for a game, to a display of a computer system that is being used by the attendee. In one embodiment, the 3D game interface represents a simulated office environment and the attendee can navigate within environment, for example, subject to doors being locked/unlocked and the like.

In an aspect, at block 1204, the game client retrieves a first set of problem-solving objectives from the leaderboard for the network security training session and presents a problem-solving objective of the first set of problem-solving objectives on the display of the computer system based on the current state of the training game. In the context of a network security device training session, the problem-solving objective may involve configuring a network security device in a particular manner or addressing a particular incident within the virtual environment.

In an aspect, at block 1206, the game client facilitates interactions by attendee with one or more network security devices, including attempts made by attendee to complete the first problem-solving objectives.

In response to completion of the first problem-solving objective by attendee, at block 1208, based on the current state of the training game, the game client retrieves and presents another problem-solving objective from the first set of problem-solving objectives on the display of the computer system.

Figure 13:
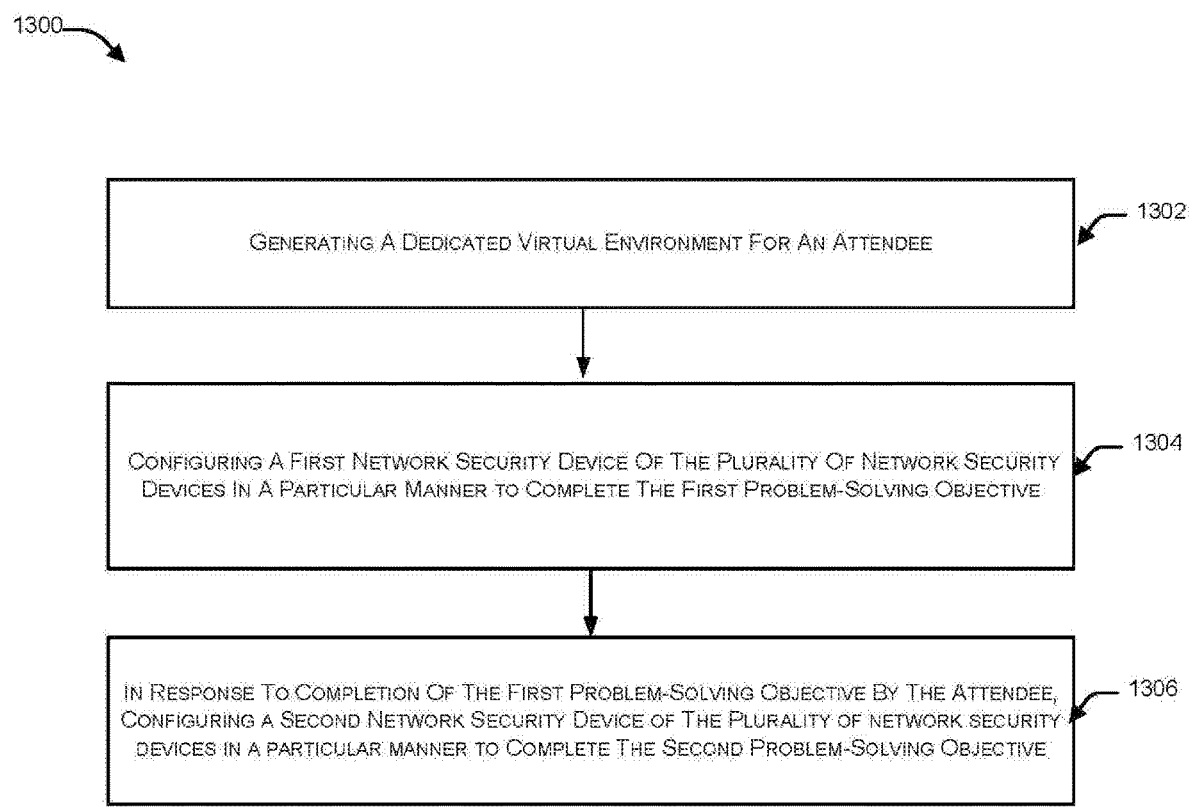
FIG. 13 is a flow diagram illustrating interactions between an attendee of a network security training session and a dedicated virtual environment in accordance with an embodiment of the present invention.

FIG. 13 is a flow diagram 1300 illustrating interactions between an attendee of a network security training session and a dedicated virtual environment in accordance with an embodiment of the present invention.

At block 1302, a dedicated virtual environment is generated by a server for each attendee of a network security training session. In one embodiment, the dedicated virtual environment contains a network topology simulating a deployed network of multiple network security devices for which each team is to receive training.

In an aspect, at block 1304, the game client retrieves a first problem-solving objective for the network security training session and presents the first problem-solving objective on the display of the computer system based on the current state of the training game. The dedicated virtual environment allows the attendees to attempt to configure a first network security device of the multiple network security devices in a particular manner to complete the first problem-solving objective.

In response to completion of the first problem-solving objective by the attendee, at block 1306, the game client retrieves a second problem-solving objective and presents the second problem-solving objective on the display of the computer system based on the current state of the training game. For example, the dedicated virtual environment enables the attendee to attempt further configuration of the first network security device or configuration of a second network security device of the multiple of network security devices in a particular manner to complete the second objective.

Figure 14:
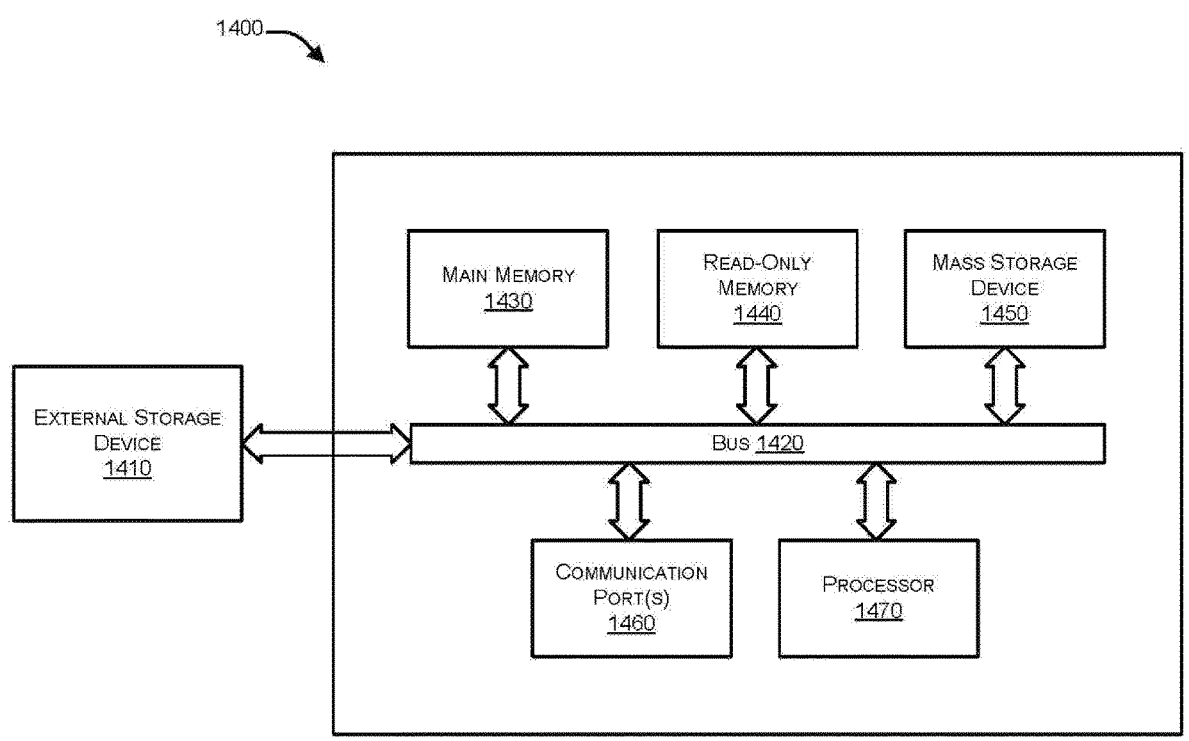
FIG. 14 illustrates an exemplary computer system in which or with which embodiments of the present invention may be utilized.

FIG. 14 illustrates an exemplary computer system 1400 in which or with which embodiments of the present invention may be utilized.

Computer system 1400 may represent all or a portion of one or more of a server (e.g., server 104 or a server hosting one or more virtual machines within environment 108), a leaderboard (e.g., leaderboard 112), an attendee device (e.g., attendee device 114-1A), a remote device (e.g., remote device 124-1) used by an online training session participant and/or an administrator device 102.

As shown in FIG. 14, computer system includes an external storage device 1410, a bus 1420, a main memory 1430, a read only memory 1440, a mass storage device 1450, a communication port 1460, and a processing resource (e.g., processor 1470).

Those skilled in the art will appreciate that computer system 1400 may include more than one processor 1470 and communication ports 1460. Examples of processor 1470 include, but are not limited to an Intel® Core i5® or Core i7® processor (s), an Intel® Itanium® or Itanium 2 processor(s), AMD® Ryzen® processor(s) or AMD® Opteron® or Athlon MP® processor(s), Motorola® lines of processors, FortiSOC™ system on a chip processors or other future processors. Processor 1470 may include various modules associated with embodiments of the present invention.

Non-limiting examples of communication port 1460 include a 10/100 Ethernet port, a Gigabit or 10 Gigabit port using copper or fiber, a serial port, a parallel port, or other existing or future ports. Communication port 1460 may be chosen depending on a network, such a Local Area Network (LAN), Wide Area Network (WAN), or any network to which computer system connects.

Memory 1430 can be Random Access Memory (RAM), or any other dynamic storage device commonly known in the art. Read only memory 1440 can be any static storage device(s) e.g., but not limited to, a Programmable Read Only Memory (PROM) chips for storing static information e.g. start-up or BIOS instructions for processor 1470.

Mass storage 1450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1420 communicatively couples processor(s) 1470 with the other memory, storage and communication blocks. Bus 1420 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1470 to software system.

Optionally, operator and administrative interfaces, e.g. a display, keyboard, and a cursor control device, may also be coupled to bus 1420 to support direct operator interaction with computer system. Other operator and administrative interfaces can be provided through network connections connected through communication port 1460. External storage device 1410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:

generating, by a server including at least a first processor, a dedicated virtual environment for a particular attendee of a plurality of attendees of a network security training session, which is part of a virtual conference demonstrating network security products, wherein the dedicated virtual environment contains a network topology simulating a deployed network of a plurality of network security devices for which the particular attendee is to receive training and wherein the plurality of network security devices are represented by corresponding full-feature virtual network security appliances within a virtual machine network, and wherein the particular attendee is included in a first team of attendees, and wherein the first team of attendees is one of a plurality of attendee teams;

creating, by a game client associated with the particular attendee, wherein the game client is executing on a second processor, a three-dimensional (3D) user interface for the virtual conference to be presented on a display of a computer system of the particular attendee, wherein the 3D user interface represents a simulated conference environment with each network security product of the plurality of network security products from one or more vendors being demonstrated as a virtual booth of a plurality of virtual booths represented in the conference environment;

causing, by the game client, the particular attendee to navigate in the 3D user interface to a first virtual booth selected from the plurality of virtual booths to access a first learning objective relating to a first network security product from a first vendor corresponding to the first booth, wherein the first learning objective involves observing a demonstration regarding the first network security product; and maintaining, by the server, progress of the particular attendee for each of the plurality of virtual booths on a scoreboard operatively coupled with computer systems of one or more other attendees of the plurality of attendees;

causing, by a first instance of the game client associated with the particular attendee on a first team of attendees of the plurality of attendee teams, a first 3D game interface for a training game to be presented to the particular attendee on the display, wherein the first 3D game interface represents a simulated office environment and wherein the first attendee can navigate within the simulated office environment;

based on a current game state, retrieving, by the game client, a first set of problem-solving objectives for the network security training session and causing a first problem-solving objective of the first set of problem-solving objectives to be presented on the display, wherein the first problem-solving objective comprises configuring a first network security device of the plurality of network security devices in a particular manner;

facilitating, by the dedicated virtual environment, interactions by the particular attendee with a real web interface of the first network security device in connection with one or more attempts by the particular attendee to complete the first problem-solving objective; and in response to completion of the first problem-solving objective by the particular attendee:

associating, by the first network security device, a rating with one or more of the particular attendee and the first team based on a current security posture of the dedicated virtual environment associated with the first team, wherein the rating is displayed on a leaderboard operatively coupled with a plurality of other instances of the game client associated with a corresponding plurality of the plurality of attendees on the first team and on one or more other teams of the plurality of teams; and based on the current game state, retrieving, by the game client, a second problem-solving objective of the first set of problem-solving objectives to be presented on the display, wherein the second problem-solving objective comprises further configuration of the first network security device or configuring of a second network security device of the plurality of network security devices in a particular manner.

2. The method of claim 1, wherein each attendee of the plurality of attendees is associated with a unique identifier.

3. The method of claim 2, wherein one or more attendees of the plurality of attendees use corresponding unique identifiers to form the first a team of attendees.

4. The method of claim 1, wherein the server enables interaction between the particular attendee and one or more other attendees of the plurality of attendees using the scoreboard represented in the 3D interface.

5. The method of claim 1, wherein the game client provides the one or more of guidance and clues until the first set of problem-solving objectives is completed by the particular attendee.

6. The method of claim 5, wherein the one or more of guidance and clues provided by the game client is dynamically updated based on completion of the one or more attempts by the particular attendee.

7. The method of claim 1, further comprising:

receiving, by a leaderboard server, from the network security device an objective completion report indicative of a completion status of one or more problem-solving objectives of the first set of problem-solving objectives or the second set of problem-solving objectives by the first team;

calculating, by the leaderboard server, an objective score for the first team based on the objective completion report and point values associated with the one or more problem-solving objectives; and causing, by the leaderboard server, the objective score for the first team to be displayed on the leaderboard.

8. The method of claim 1, wherein the first set of problem-solving objectives is presented in a first room represented within the simulated office environment such that when the first set of problem-solving objectives pertaining to the first room is completed, the first room is unlocked and a second set of problem-solving objectives is performed in a second are presented in the simulated office environment.

9. A system comprising:

a processing resource; and a non-transitory computer-readable medium, coupled to the processing resource, having stored therein instructions that when executed by the processing resource cause the processing resource to:

generate a dedicated virtual environment for a particular attendee of a plurality of attendees of a network security training session, which is part of a virtual conference demonstrating network security products, wherein the dedicated virtual environment contains a network topology simulating a deployed network of a plurality of network security devices for which the particular attendee is to receive training and wherein the plurality of network security devices are represented by corresponding full-feature virtual network security appliances within a virtual machine network, and wherein the particular attendee is included in a first team of attendees, and wherein the first team of attendees is one of a plurality of attendee teams;

create a three-dimensional (3D) user interface for the virtual conference to be presented on a display of a computer system of the particular attendee, wherein the 3D user interface represents a simulated conference environment with each network security product of the plurality of network security products from one or more vendors being demonstrated as a virtual booth of a plurality of virtual booths represented in the conference environment;

cause the particular attendee to navigate in the 3D user interface to a first virtual booth selected from the plurality of virtual booths to access a first learning objective relating to a first network security product from a first vendor corresponding to the first booth, wherein the first learning objective involves observing a demonstration regarding the first network security product; and maintain progress of the particular attendee for each of the plurality of virtual booths on a scoreboard operatively coupled with computer systems of one or more other attendees of the plurality of attendees cause, by a first instance of a game client associated with the particular attendee on a first team of attendees of the plurality of attendee teams, a first 3D game interface for a training game to be presented to the particular attendee on the display, wherein the first 3D game interface represents a simulated office environment and wherein the first attendee can navigate within the simulated office environment;

based on a current game state, retrieve, by the game client, a first set of problem-solving objectives for the network security training session and causing a first problem-solving objective of the first set of problem-solving objectives to be presented on the display, wherein the first problem-solving objective comprises configuring a first network security device of the plurality of network security devices in a particular manner;

facilitate, by the dedicated virtual environment, interactions by the particular attendee with a real web interface of the first network security device in connection with one or more attempts by the particular attendee to complete the first problem-solving objective; and in response to completion of the first problem-solving objective by the particular attendee:
  associate, by the first network security device, a rating with one or more of the particular attendee and the first team based on a current security posture of the dedicated virtual environment associated with the first team, wherein the rating is displayed on a leaderboard operatively coupled with a plurality of other instances of the game client associated with a corresponding plurality of the plurality of attendees on the first team and on one or more other teams of the plurality of teams; and
  based on the current game state, retrieve, by the game client, a second problem-solving objective of the first set of problem-solving objectives to be presented on the display, wherein the second problem-solving objective comprises further configuration of the first network security device or configuring of a second network security device of the plurality of network security devices in a particular manner.

10. The system of claim 9, wherein each attendee of the plurality of attendees is associated with a unique identifier.

11. The system of claim 10, wherein one or more attendees of the plurality of attendees use corresponding unique identifiers to form the first team of attendees.

12. The system of claim 9, wherein the instructions further causes the processing resource to enable interaction between the particular attendee and one or more other attendees of the plurality of attendees using the scoreboard represented in the 3D interface.

13. The system of claim 9, wherein the game client provides the one or more of guidance and clues until the first set of problem-solving objectives is completed by the particular attendee.

14. The system of claim 13, wherein the one or more of guidance and clues provided by the game client is dynamically updated based on completion of the one or more attempts by the particular attendee.

15. The system of claim 9, wherein the instructions further cause the processing resource to:
  receive, by a leaderboard server, from the network security device an objective completion report indicative of a completion status of one or more problem-solving objectives of the first set of problem-solving objectives or the second set of problem-solving objectives by the first team;
  calculate, by the leaderboard server, an objective score for the first team based on the objective completion report and point values associated with the one or more problem-solving objectives; and
  cause, by the leaderboard server, the objective score for the first team to be displayed on the leaderboard.

16. The system of claim 9, wherein the first set of problem-solving objectives is presented in a first room represented within the simulated office environment such that when the first set of problem-solving objectives pertaining to the first room is completed, the first room is unlocked and a second set of problem-solving objectives is performed in a second are presented in the simulated office environment.

* * * * *